United States Patent
Yamauchi et al.

(10) Patent No.: US 11,533,548 B2
(45) Date of Patent: Dec. 20, 2022

(54) TRANSMISSION DEVICE, TRANSMISSION METHOD, AND TRANSMISSION SYSTEM

(71) Applicant: FUJITSU LIMITED, Kawasaki (JP)

(72) Inventors: Tomohiro Yamauchi, Kawasaki (JP); Tomoyuki Kato, Yokohama (JP); Shigeki Watanabe, Kawasaki (JP); Yu Tanaka, Kawasaki (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 24 days.

(21) Appl. No.: 17/360,002

(22) Filed: Jun. 28, 2021

(65) Prior Publication Data

US 2022/0070555 A1 Mar. 3, 2022

(30) Foreign Application Priority Data

Aug. 25, 2020 (JP) .............................. JP2020-141492

(51) Int. Cl.
*H04Q 11/00* (2006.01)
*H04J 14/02* (2006.01)
*H04B 10/291* (2013.01)

(52) U.S. Cl.
CPC ....... *H04Q 11/0005* (2013.01); *H04B 10/291* (2013.01); *H04J 14/0209* (2013.01); *H04J 14/0221* (2013.01); *H04J 14/0282* (2013.01); *H04Q 2011/0011* (2013.01)

(58) Field of Classification Search
CPC ........ H04Q 11/0005; H04Q 2011/0011; H04B 10/291; H04B 10/294; H04J 14/0209; H04J 14/0221; H04J 14/0282; H04J 14/0265

See application file for complete search history.

(56) References Cited

FOREIGN PATENT DOCUMENTS

| JP | 2003-188830 A | 7/2003 | |
|---|---|---|---|
| JP | 2004-128802 A | 4/2004 | |
| JP | 2005-223944 A | 8/2005 | |
| WO | WO 2005/025243 | * 3/2005 | ........... H04B 10/299 |

* cited by examiner

*Primary Examiner* — Leslie C Pascal
(74) *Attorney, Agent, or Firm* — Staas & Halsey LLP

(57) ABSTRACT

A transmission device including a demultiplexer configured to demultiplex a multiplexed light obtained by multiplexing the plurality of wavelength division multiplexing (WDM) optical signals including different wavelength bands into the plurality of WDM optical signals, a plurality of optical amplifiers configured to amplify the plurality of WDM optical signals, respectively, a wavelength converter configured to convert a first wavelength band of the wavelength bands of at least a first WDM optical signal of the plurality of WDM optical signals amplified by the plurality of optical amplifiers into a second wavelength band of the wavelength bands of a second WDM optical signal of the plurality of WDM optical signals so that the second wavelength band does not overlap among the wavelength bands, and a multiplexer configured to multiplex the plurality of WDM optical signals which include the wavelength bands converted by the wavelength converter.

12 Claims, 22 Drawing Sheets

FIG. 12

| CONTROL EXAMPLE | WAVELENGTH BAND | POWER | OPTICAL SWITCH | PATH |
|---|---|---|---|---|
| #1 | L-BAND | HIGH | 43a | R1a |
| | C-BAND | MEDIUM | 43b | R1b |
| | S-BAND | LOW | 43c | R2c |
| #2 | L-BAND | MEDIUM | 43a | R2a |
| | C-BAND | HIGH | 43b | R3b |
| | S-BAND | LOW | 43c | R2c |
| #3 | L-BAND | LOW | 43a | R2a |
| | C-BAND | LOW | 43b | R2b |
| | S-BAND | HIGH | 43c | R1c |

FIG. 16
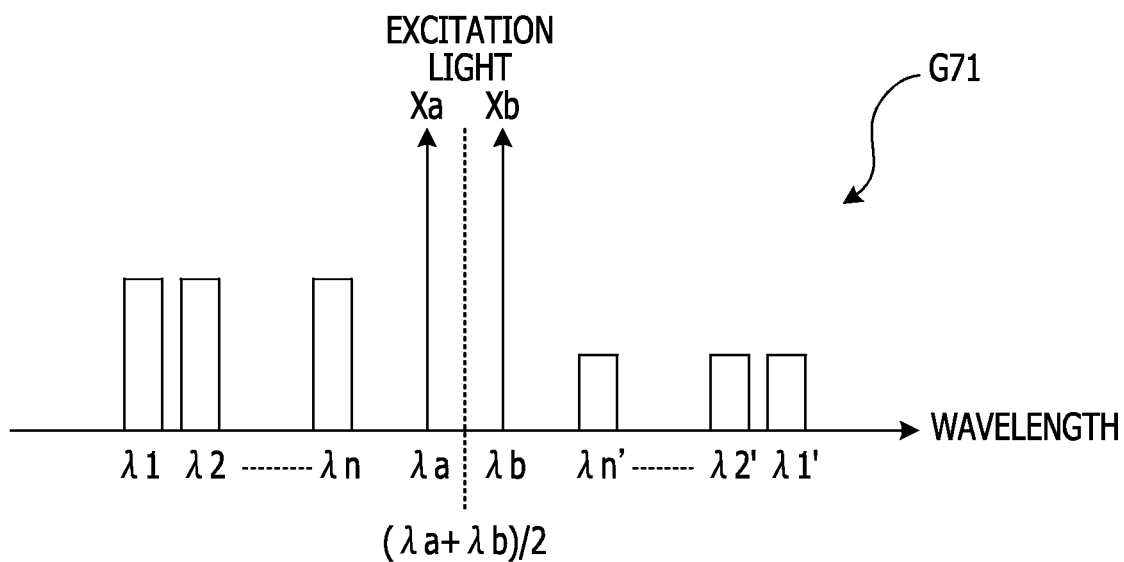
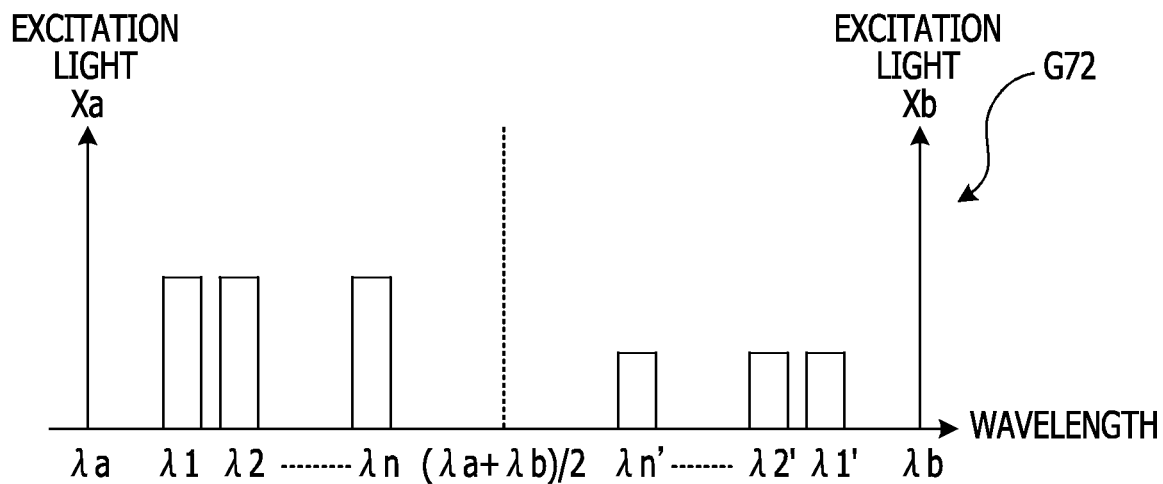

TRANSMISSION DEVICE, TRANSMISSION METHOD, AND TRANSMISSION SYSTEM

CROSS-REFERENCE TO RELATED APPLICATION

This application is based upon and claims the benefit of the prior Japanese Patent Application No. 2020-141492 filed on Aug. 25, 2020, the entire contents of which are incorporated herein by reference.

FIELD

The embodiments discussed herein are related to a transmission device, a transmission method, and a transmission system.

BACKGROUND

Accompanying the increase in communication demand, the transmission capacity of wavelength division multiplexing (WDM) may be increased by increasing the channels of wavelength division multiplexing optical signals. For example, when a transmission is performed using only conventional band (C-band) wavelength division multiplexing optical signals, the wavelength band may be limited to 1530 nm to 1565 nm.

In contrast, for example, it is possible to increase the transmission capacity of the WDM by extending the wavelength band to the long band (L-band) of 1565 nm to 1625 nm and the short band (S-band) of 1460 nm to 1530 nm. For example, Japanese Laid-Open Patent Publication No. 2003-188830 describes a technology in which the C-band, L-band, and S-band wavelength division multiplexing optical signals are multiplexed and transmitted by converting the C-band wavelength division multiplexing optical signals into the L-band and S-band wavelength division multiplexing optical signals.

Related technologies are disclosed in, for example, Japanese Laid-open Patent Publication No. 2003-188830.

SUMMARY

According to an aspect of the embodiments, a transmission device including a demultiplexer configured to demultiplex a multiplexed light obtained by multiplexing the plurality of wavelength division multiplexing (WDM) optical signals including different wavelength bands into the plurality of WDM optical signals, a plurality of optical amplifiers configured to amplify the plurality of WDM optical signals, respectively, a wavelength converter configured to convert a first wavelength band of the wavelength bands of at least a first WDM optical signal of the plurality of WDM optical signals amplified by the plurality of optical amplifiers into a second wavelength band of the wavelength bands of a second WDM optical signal of the plurality of WDM optical signals so that the second wavelength band does not overlap among the wavelength bands of the plurality of WDM optical signals, and a multiplexer configured to multiplex the plurality of WDM optical signals which include the wavelength bands converted by the wavelength converter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram illustrating a control example of an optical switch;

FIG. 16 is a diagram illustrating an example of the wavelength conversion by a wavelength converter including two excitation light sources;

DESCRIPTION OF EMBODIMENTS

The transmission characteristics of the C-band, L-band, and S-band wavelength division multiplexing optical signals are different from each other because the transmission path loss and the power due to the Raman scattering are irregularly distributed for each wavelength band. Therefore, the transmission performance (e.g., a transmission distance) of the entire transmission system may be limited by the worst transmission characteristic among the transmission characteristics of each wavelength division multiplexing optical signal of the C-band, L-band, and S-band.

Hereinafter, with reference to the accompanying drawings, descriptions will be made on the embodiments of a technique capable of reducing the difference in transmission characteristics among a plurality of wavelength division multiplexing optical signals.

[Comparison Example of Transmission System]

Figure 1:
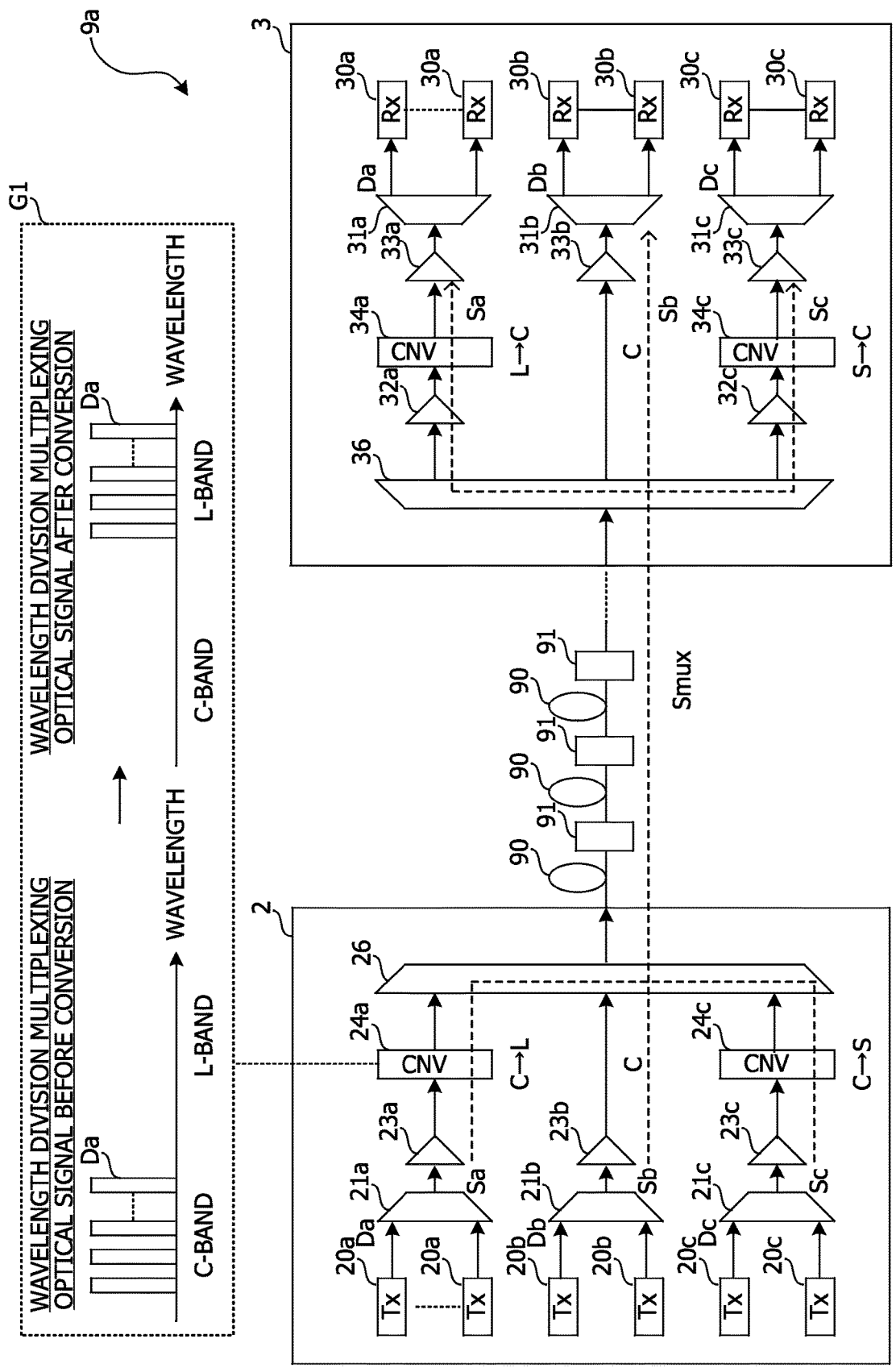
FIG. 1 is a configuration diagram illustrating a comparative example of a transmission system.

FIG. 1 is a configuration diagram illustrating a comparative example of a transmission system 9. The transmission system 9a includes, for example, a transmission path 90 formed of an optical fiber or the like, a plurality of nodes 91 provided on the transmission path 90, and a transmission device 2 and a reception device 3 connected to each other via the transmission path 90.

As indicated by the dotted line, the transmission device 2 multiplexes the C-band, L-band, and S-band wavelength division multiplexing optical signals Sa to Sc to generate a multiplexed light Smux, which is transmitted to the reception device 3 via the transmission path 90. The transmission device 2 includes a plurality of transmitters (Tx) 20a to 20c, multiplexers 21a to 21c, optical amplifiers 23a to 23c, wavelength converters (CNV) 24a and 24c, and a multiplexer 26.

The wavelength converter 24a converts the wavelength band of the wavelength division multiplexing optical signal Sa from the C-band to the L-band, and the wavelength converter 24c converts the wavelength band of the wavelength division multiplexing optical signal Sc from the C-band to the S-band. Therefore, the wavelength bands of the wavelength division multiplexing optical signals Sa, Sb, and Sc are different from each other.

The plurality of transmitters 20a, the multiplexer 21a, the optical amplifier 23a, and the wavelength converter 24a are provided on the path of the wavelength division multiplexing optical signal Sa. Each of the transmitters 20a generates an optical signal Da having a wavelength in the C-band and outputs the generated signal Da to the multiplexer 21a. The wavelengths of the optical signals Da of the respective transmitters 20a are different from each other.

The plurality of transmitters 20b, the multiplexer 21b, and the optical amplifier 23b are provided on the path of the wavelength division multiplexing optical signal Sb. Each of the transmitters 20b generates an optical signal Db having a wavelength in the C-band and outputs the generated signal Db to the multiplexer 21b. The wavelengths of the optical signals Db of the respective transmitters 20b are different from each other.

The plurality of transmitters 20c, the multiplexer 21c, and the optical amplifier 23c are provided on the path of the wavelength division multiplexing optical signal Sc. Each of the transmitters transmitter 20c generates an optical signal Dc having a wavelength in the C-band and outputs the generated signal Dc to the multiplexer 21c. The wavelengths of the optical signals Dc of the respective transmitters 20c are different from each other.

The transmitters 20a to 20c are connected to the local area network (LAN) on a client side. The transmitters 20a to 20c generate optical signals Da to Dc, respectively, from a client signal such as the Ethernet (registered trademark, the same applies hereinafter) signal.

The multiplexer 21a multiplexes the optical signal Da input from each transmitter 20a to generate a C-band wavelength division multiplexing optical signal Sa and outputs the generated signal Sa to the optical amplifier 23a. Further, similarly to the multiplexer 21a, the multiplexer 21b generates a C-band wavelength division multiplexing optical signal Sb from each optical signal Db to output the generated signal Sb to the optical amplifier 23b, and the multiplexer 21c generates a C-band wavelength division multiplexing optical signal Sc from each optical signal Dc to output the generated signal Sc to the optical amplifier 23c. Also, the multiplexers 21a to 21c are, for example, optical couplers.

The optical amplifiers 23a to 23c amplify the wavelength division multiplexing optical signals Sa to Sc, respectively. The optical amplifiers 23a to 23c are, for example, erbium doped optical fiber amplifiers (EDFA). The optical amplifier 23a outputs the wavelength division multiplexing optical signal Sa to the wavelength converter 24a. The optical amplifier 23b outputs the wavelength division multiplexing optical signal Sa to the multiplexer 26. The optical amplifier 23c outputs the wavelength division multiplexing optical signal Sc to the wavelength converter 24c.

The wavelength converter 24a converts the wavelength band of the wavelength division multiplexing optical signal Sa from the C-band to the L-band, as indicated by a reference numeral "G1." As a result, the wavelength of each optical signal Da that is wavelength-multiplexed by the wavelength division multiplexing optical signal Sa is converted from the C-band to the L-band. Further, the wavelength converter 24c converts the wavelength band of the wavelength division multiplexing optical signal Sc from the C-band to the S-band. As a result, the wavelength of each optical signal Dc that is wavelength-multiplexed to the wavelength division multiplexing optical signal Sc is converted from the C-band to the S-band. The wavelength converters 24a and 24c output the converted wavelength division multiplexing optical signals Sa and Sc, respectively, to the multiplexer 26.

The multiplexer 26 multiplexes the wavelength division multiplexing optical signals Sa and Sc input from the wavelength converters 24a and 24c and the wavelength division multiplexing optical signal Sb input from the optical amplifier 23b, respectively, to output the multiplexed light Smux to the transmission path 90. The multiplexer 26 is, for example, an optical coupler.

In this way, the transmission device 2 multiplexes the L-band wavelength-multiplexed optical signal Sa, the C-band wavelength-multiplexed optical signal Sb, and the S-band wavelength-multiplexed optical signal Sc in which the optical signals Da to Dc are wavelength-multiplexed, respectively, and transmits the multiplexed light Smux to the reception device 3.

The multiplexed light Smux is relayed to the reception device 3 by a plurality of nodes 91 on the transmission path 90. The plurality of nodes 91 are provided with optical amplifiers (not illustrated) that amplify the wavelength division multiplexing optical signals Sa, Sb, and Sc, respectively.

The reception device 3 includes a plurality of receivers (Rx) 30a to 30c, demultiplexers 31a to 31c, optical amplifiers 32a, 32c, and 33a to 33c, wavelength converters (CNV) 34a and 34c, and a demultiplexer 36. The multiplexed light Smux is input from the transmission path 90 to the demultiplexer 36.

The demultiplexer 36 demultiplexes the multiplexed light Smux for each wavelength band and outputs the demultiplexed light Smux from different ports. The demultiplexer 36 is, for example, an optical splitter.

The L-band wavelength division multiplexing optical signal Sa is amplified by the optical amplifier 32a and then input to the wavelength converter 34a. The wavelength converter 34a converts the wavelength band of the wavelength division multiplexing optical signal Sa from the L-band to the C-band and outputs the converted wavelength band to the optical amplifier 33a. The optical amplifier 33a amplifies the wavelength division multiplexing optical signal Sa and outputs the amplified signal Sa to the demultiplexer 31a.

The S-band wavelength division multiplexing optical signal Sc is amplified by the optical amplifier 32c and then input to the wavelength converter 34c. The wavelength converter 34c converts the wavelength band of the wavelength division multiplexing optical signal Sc from the S-band to the C-band and outputs the converted wavelength band to the optical amplifier 33c. The optical amplifier 33c amplifies the wavelength division multiplexing optical signal Sc and outputs the amplified signal Sc to the demultiplexer 31c. Further, the configurations of the wavelength converters 34a and 34c will be described later.

The C-band wavelength division multiplexing optical signal Sb is input from the demultiplexer 36 to the optical amplifier 33b. The optical amplifier 33b amplifies the wavelength division multiplexing optical signal Sb and outputs the amplified optical signal Sb to the demultiplexer 31b.

The demultiplexer 31a demultiplexes the wavelength division multiplexing optical signal Sa into the optical signal Da for each wavelength and outputs the signal to the receiver 30a. The demultiplexer 31b demultiplexes the wavelength division multiplexing optical signal Sb into the optical signal Db for each wavelength and outputs the signal to the receiver 30b. The demultiplexer 31c demultiplexes the wavelength division multiplexing optical signal Sc into the optical signal Dc for each wavelength and outputs the signal to the receiver 30c. The duplexers 31a to 31c are, for example, optical splitters.

The receivers 30a to 30c receive the optical signals Da to Dc, respectively. The receivers 30a to 30c are connected to a LAN or the like on the client side, and generate a client signal from, for example, optical signals Da to Dc and transmit the client signal to the LAN.

In this way, the reception device 3 receives the multiplexed light Smux and demultiplexes the L-band wavelength division multiplexing optical signal Sa, the C-band wavelength division multiplexing optical signal Sb, and the S-band wavelength division multiplexing optical signal Sc from the multiplexed light Smux.

[Difference in Transmission Performance for Each Wavelength Band]

The transmission characteristics of the C-band, L-band, and S-band wavelength division multiplexing optical signals Sa, Sb, and Sc are different from each other because the transmission path loss and the power due to Raman scattering are irregularly distributed for each wavelength band. Therefore, the transmission performance (e.g., a transmission distance) of the entire transmission system 9 is limited by the worst transmission characteristic among the transmission characteristics of the C-band, L-band, and S-band wavelength division multiplexing optical signals Sa, Sb, and Sc.

Figure 2:
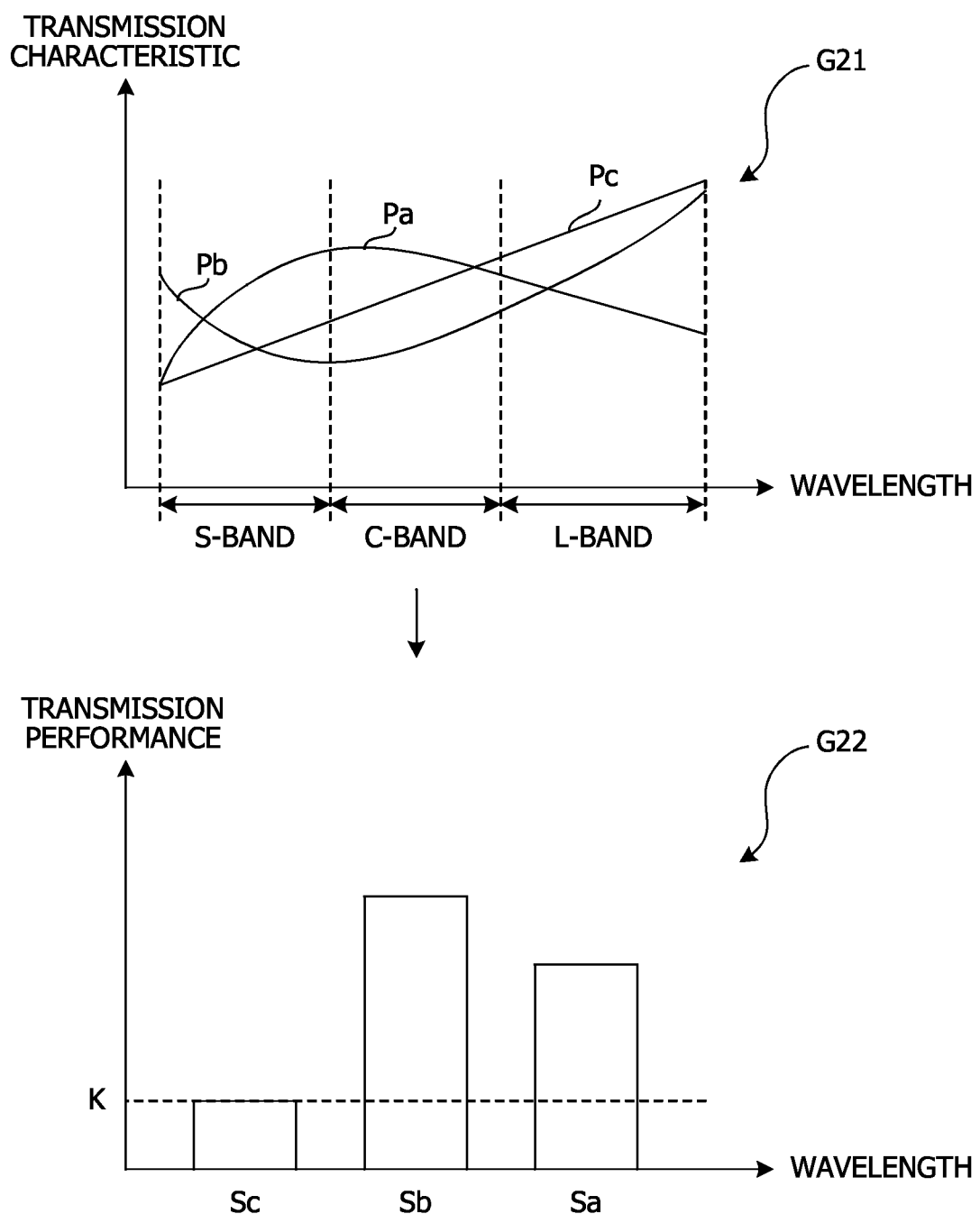
FIG. 2 is a diagram illustrating an example of transmission characteristics and transmission performance for each wavelength band of a wavelength division multiplexing optical signal.

FIG. 2 is a diagram illustrating an example of transmission characteristics and transmission performance for each wavelength band of wavelength division multiplexing optical signals Sa, Sb, and Sc.

The reference numeral "G21" indicates an example of a change in transmission characteristics with respect to the wavelength. Here, a reference numeral "Pa" indicates a change in transmission characteristics when the transmission loss of the transmission path 90 is taken into consideration, and the reference numeral "Pb" indicates a change in transmission characteristics when the excitation light of distributed Raman amplification input from the optical amplifier of each node 91 to the transmission path 90 is taken into consideration. Further, the reference numeral "Pc" indicates a change in transmission characteristics in consideration of induced Raman scattering that occurs in the transmission path 90.

The wavelength division multiplexing optical signal Sc of the S-band has a lower amplification performance (e.g., a maximum output, gain, and noise factor (NF)) of the optical amplifier than the wavelength division multiplexing optical signals Sa and Sb of the C-band and the L-band, and is easily absorbed by the C-band and L-band wavelength division multiplexing optical signals Sa and Sb due to induced Raman scattering. Therefore, the transmission characteristics of the S-band are often lower than the transmission characteristics of the C-band and the L-band. Further, the transmission characteristics are not limited thereto, and the C-band or L-band transmission characteristics may be lower than the S-band transmission characteristics depending on the configuration of the transmission system 9.

The reference numeral "G22" indicates the transmission performance of the wavelength division multiplexing optical signals Sa, Sb, and Sc. As described above, since the transmission characteristics of the S-band are lower than the transmission characteristics of the C-band and the L-band, the transmission performance of the wavelength division multiplexing optical signal Sc is the worst among the wavelength division multiplexing optical signals Sa, Sb, and Sc. Therefore, the transmission performance (e.g., a transmission distance) of the entire transmission system 9 is limited by the transmission characteristic K of the wavelength division multiplexing optical signal Sc.

[Example of Relay Device]

Therefore, by providing each node 91 on the transmission path 90 with a relay device that converts the wavelength bands of the wavelength division multiplexing optical signals Sa, Sb, and Sc into other wavelength bands of the wavelength division multiplexing optical signals Sa, Sb, and Sc, the difference in the number of transmission spans in which each of the wavelength division multiplexing optical signals Sa, Sb, and Sc is transmitted in the S-band is reduced. As a result, the difference in transmission characteristics of each of the wavelength division multiplexing optical signals Sa, Sb, and Sc is reduced. The process of the relay device described below is an example of a transmission method.

Figure 3:
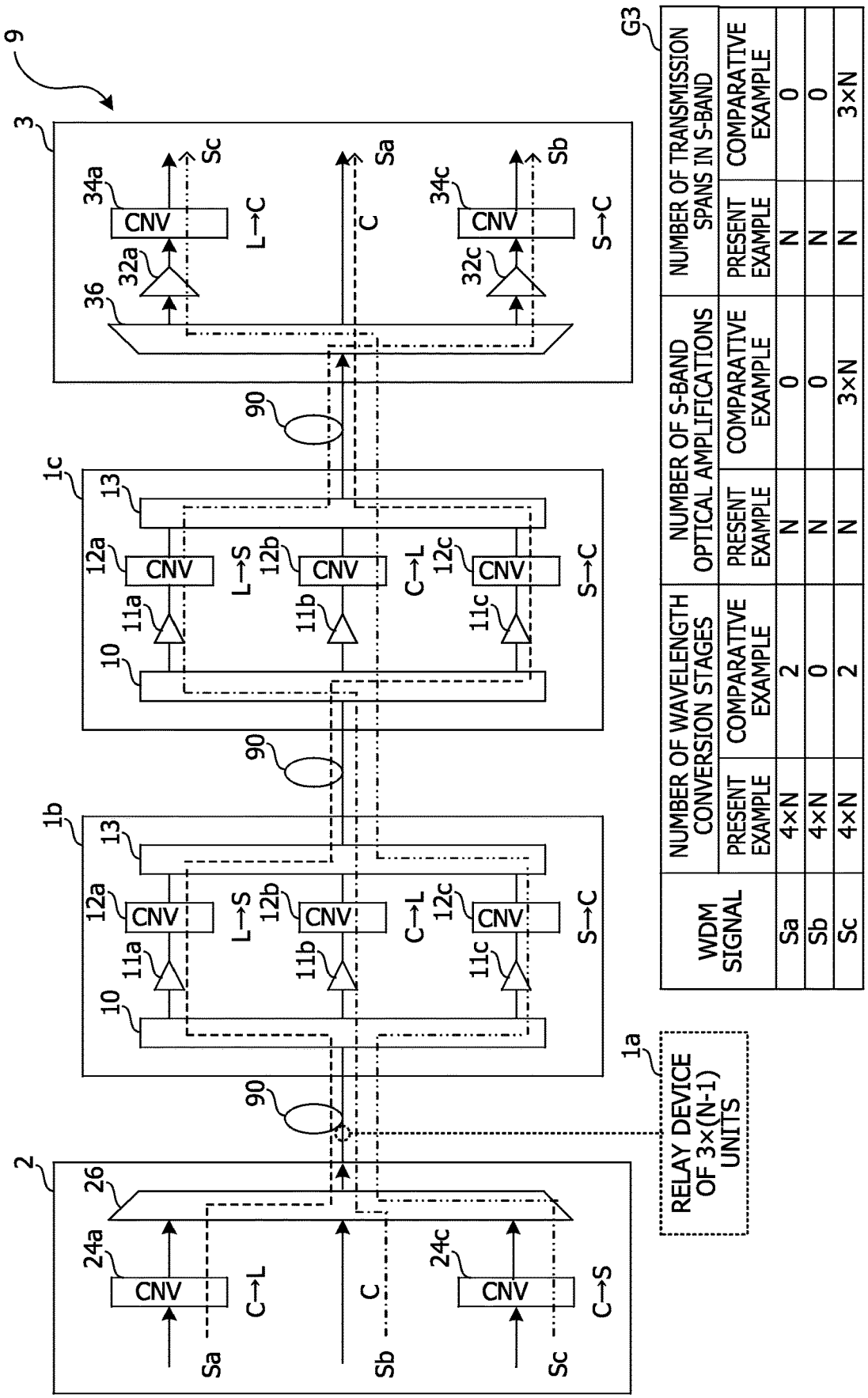
FIG. 3 is a configuration diagram illustrating a first example of a transmission system provided with a relay device so that the number of transmission spans is a multiple of the number of wavelength division multiplexing optical signals.

FIG. 3 is a configuration diagram illustrating a first example of a transmission system 9 in which relay devices 1b and 1c are provided so that the number of transmission spans is a multiple of the number of wavelength division multiplexing optical signals Sa, Sb, and Sc. In FIG. 3, the same reference numerals are given to the configurations common to those in FIG. 1, and the description thereof will be omitted. For convenience, only a part of the configurations illustrated in FIG. 1 is illustrated for the transmission device 2 and the reception device 3.

The number of transmission spans is the number of transmission sections of the transmission path 90 divided by the relay devices 1b and 1c of each node 91. In this example, the transmission path 90 is divided into three transmission sections by the relay devices 1b and 1c, so that the number of transmission spans is three. However, in the following description, it is assumed that a relay device 1a of 3×(N−1) units (N: an integer of 1 or more) is further provided between the transmission device 2 and the relay device 1b, and the number of transmission spans is in a general format of (3×N). For example, when N=1, only two relay devices 1b and 1c are provided on the transmission path 90, so that the number of transmission spans is three.

The relay devices 1a, 1b, and 1c have the same configuration. The relay devices 1a, 1b, and 1c include a demultiplexer 10 such as a wavelength divisional multiplexing (WDM) filter, optical amplifiers 11a, 11b, and 11c, wavelength converters 12a, 12b, and 12c, and a multiplexer such as an optical coupler 13. Further, the relay devices 1a, 1b, and 1c are examples of a transmission device.

The demultiplexer 10 is an example of a separation unit, and separates each of the wavelength division multiplexing optical signals Sa, Sb, and Sc from the multiplexed light Smux of the wavelength division multiplexing optical signals Sa, Sb, and Sc. The demultiplexer 10 outputs the wavelength division multiplexing optical signals Sa, Sb, and Sc from separate output ports according to the wavelength band to the optical amplifiers 11a, 11b, and 11c corresponding to the wavelength band, respectively. Further, the wavelength division multiplexing optical signals Sa, Sb, and Sc input to the optical amplifiers 11a, 11b, and 11c are determined according to their respective paths.

The optical amplifier 11a amplifies the L-band wavelength division multiplexing optical signals Sa, Sb, and Sc, the optical amplifier 11b amplifies the C-band wavelength division multiplexing optical signals Sa, Sb, and Sc, and the optical amplifier 11c amplifies the S-band wavelength division multiplexing optical signals Sa, Sb, and Sc. The optical amplifiers 11a, 11b, and 11c output the amplified wavelength division multiplexing optical signals Sa, Sb, and Sc to the wavelength converters 12a, 12b, and 12c, respectively. Further, the wavelength division multiplexing optical signals Sa, Sb, and Sc input to the wavelength converters 12a, 12b, and 12c are determined according to their respective paths.

The wavelength converter 12a converts the L-band wavelength division multiplexing optical signals Sa, Sb, and Sc into the S-band wavelength division multiplexing optical signals Sa, Sb, and Sc. The wavelength converter 12b converts the C-band wavelength division multiplexing optical signals Sa, Sb, and Sc into the L-band wavelength division multiplexing optical signals Sa, Sb, and Sc. The wavelength converter 12c converts the S-band wavelength division multiplexing optical signals Sa, Sb, and Sc into the C-band wavelength division multiplexing optical signals Sa, Sb, and Sc.

In this way, the wavelength converters 12a, 12b, and 12c convert the wavelength bands of the amplified wavelength division multiplexing optical signals Sa, Sb, and Sc into other wavelength bands of the wavelength division multiplexing optical signals Sa, Sb, and Sc so that the wavelength bands do not overlap among the wavelength division multiplexing optical signals Sa, Sb, and Sc. Further, the wavelength converters 12a, 12b, and 12c are examples of wavelength converters.

The multiplexer 13 is an example of a multiplexing unit, and multiplexes wavelength division multiplexing optical signals Sa, Sb, and Sc whose wavelength band is converted by the wavelength converters 12a, 12b, and 12c. Therefore, the wavelength division multiplexing optical signals Sa, Sb, and Sc are again transmitted as multiplexed light to the relay devices 1b and 1c, or the reception device 3 of the node 91 in the subsequent stage.

Next, the paths of the wavelength division multiplexing optical signals Sa, Sb, and Sc will be described. Here, the case where N=1 and there are no relay devices 1a of 3×(N−1) units will be mentioned.

The path of the wavelength division multiplexing optical signal Sa is indicated by a dotted line. The wavelength band of the wavelength division multiplexing optical signal Sa is converted from the C-band to the L-band by the wavelength converter 24a of the transmission device 2, and input from the multiplexer 26 to the demultiplexer 10 of the relay device 1b via the transmission path 90. The wavelength band of the wavelength division multiplexing optical signal Sa is converted from the L-band to the S-band by the wavelength converter 12a of the relay device 1b, and input from the multiplexer 26 to the demultiplexer 10 of the relay device 1c via the transmission path 90. The wavelength band of the wavelength division multiplexing optical signal Sa is converted from the S-band to the C-band by the wavelength converter 12c of the relay device 1c, input from the multiplexer 26 to the demultiplexer 36 of the reception device 3 via the transmission path 90, and received by the receiver 30b.

As described above, the wavelength multiplex optical signal Sa is transmitted in the L-band in the transmission path 90 between the transmission device 2 and the relay device 1b, is transmitted in the S-band in the transmission path 90 between the relay device 1b and the relay device 1c, and transmitted in the C-band in the transmission path 90 between the relay device 1c and the reception device 3. That is, the number of transmission spans for each wavelength band of the wavelength division multiplexing optical signal Sa is all 1.

The path of the wavelength division multiplexing optical signal Sb is indicated by a chain single-dashed line. The wavelength division multiplexing optical signal Sb is input from the multiplexer 26 of the transmission device 2 to the demultiplexer 10 of the relay device 1b via the transmission path 90. The wavelength band of the wavelength division multiplexing optical signal Sb is converted from the C-band to the L-band by the wavelength converter 12b of the relay device 1b, and input from the multiplexer 26 to the demultiplexer 10 of the relay device 1c via the transmission path 90. The wavelength band of the wavelength division multiplexing optical signal Sb is converted from the L-band to the S-band by the wavelength converter 12a of the relay device 1c, and input from the multiplexer 26 to the demultiplexer 36 of the reception device 3 via the transmission path 90. The wavelength division multiplexing optical signal Sb is received by the reception device 30c when the wavelength band is converted from the S-band to the C-band by the wavelength converter 34c of the reception device 3.

As described above, the wavelength multiplex optical signal Sb is transmitted in the C-band in the transmission path 90 between the transmission device 2 and the relay device 1b, transmitted in the L-band in the transmission path 90 between the relay device 1b and the relay device 1c, and transmitted in the S-band in the transmission path 90 between the relay device 1c and the reception device 3. That is, the number of transmission spans for each wavelength band of the wavelength division multiplexing optical signal Sb is all 1.

The path of the wavelength division multiplexing optical signal Sc is indicated by a chain double-dashed line. The wavelength band of the wavelength division multiplexing optical signal Sc is converted from the C-band to the S-band by the wavelength converter 24c of the transmission device 2, and input from the multiplexer 26 to the demultiplexer 10 of the relay device 1b via the transmission path 90. The wavelength band of the wavelength division multiplexing optical signal Sc is converted from the S-band to the C-band by the wavelength converter 12c of the relay device 1b, and input from the multiplexer 26 to the demultiplexer 10 of the relay device 1c via the transmission path 90. The wavelength band of the wavelength division multiplexing optical signal Sc is converted from the C-band to the L-band by the wavelength converter 12b of the relay device 1c, and input from the multiplexer 26 to the demultiplexer 36 of the reception device 3 via the transmission path 90. The wavelength division multiplexing optical signal Sc is converted from the L-band to the C-band by the wavelength converter 34a of the reception device 3 and received by the receiver 30a.

As described above, the wavelength multiplex optical signal Sc is transmitted in the C-band in the transmission path 90 between the transmission device 2 and the relay device 1b, transmitted in the L-band in the transmission path 90 between the relay device 1b and the relay device 1c, and transmitted in the S-band in the transmission path 90 between the relay device 1c and the reception device 3. That is, the number of transmission spans for each wavelength band of the wavelength division multiplexing optical signal Sb is all 1.

Therefore, the relay devices 1b and 1c may transmit the three transmission spans in the three different wavelength bands by converting the wavelength bands of the wavelength division multiplexing optical signals Sa, Sb, and Sc into other wavelength bands, respectively, and make the number of transmission spans for each wavelength band of the wavelength division multiplexing optical signals Sa, Sb, and Sc the same. Therefore, since the number of transmission spans of the S-band having poor transmission characteristics is 1 for all of the wavelength division multiplexing optical signals Sa, Sb, and Sc, the difference in transmission characteristics among the wavelength division multiplexing optical signals Sa, Sb, and Sc is reduced.

Further, when $N \neq 1$, the wavelength bands of the wavelength division multiplexing optical signals Sa, Sb, and Sc are converted by the relay device 1a of $3 \times (N-1)$ units. Here, the relay device 1a of $3 \times (N-1)$ units divides the transmission path 90 between the transmission device 2 and the relay device 1b into $(3 \times (N-1)+1)$ transmission spans. In addition, since the transmission path 90 between the relay device 1b and the relay device 1c is divided into two transmission spans, the total number of transmission spans between the transmission device 2 and the reception device 3 is $3 \times N$, that is, a multiple of 3, which is the number of wavelength division multiplexing optical signals Sa, Sb, and Sc.

Therefore, the relay devices 1 of $3 \times (N-1)$ units and the relay devices 1b and 1c may divide the $(3 \times N)$ transmission span into two transmission spans and transmit the transmission span in three different wavelength bands, thereby making the number of transmission spans for each wavelength band of the wavelength division multiplexing optical signals Sa, Sb, and Sc the same. For example, when $N=2$, the number of transmission spans for each wavelength band of the wavelength division multiplexing optical signals Sa, Sb, and Sc is 2, and when $N=3$, the number of transmission spans for each wavelength band of the wavelength division multiplexing optical signals Sa, Sb, and Sc is 3.

A reference numeral "G3" indicates the number of wavelength conversion stages of the wavelength division multiplexing optical signals Sa, Sb, and Sc (see the "WDM signal") in this example and the comparative example of FIG. 1, the number of amplifications by the S-band optical amplifiers 11c and 32c, and the number of transmission spans in the S-band. The wavelength band conversion in the comparative example is not performed at the node 91 on the transmission path, but is performed only at the wavelength division multiplexing optical signals Sa and Sc only at the transmission device 2 and the reception device 3. Therefore, the number of wavelength conversion stages of the wavelength division multiplexing optical signals Sa and Sc is two, and the number of wavelength conversion stages of the wavelength division multiplexing optical signal Sb is zero.

In contrast, in this example, the wavelength conversion of the wavelength division multiplexing optical signals Sa, Sb, and Sc is executed in each of the relay devices 1a, 1b, and 1c. Therefore, when the wavelength conversion of the transmission device 2 and the reception device 3 is added, the number of wavelength conversion stages of the wavelength division multiplexing optical signals Sa, Sb, and Sc becomes $(4 \times N)$, respectively. Here, since the wavelength conversion from the L-band to the S-band is a wavelength conversion beyond the intermediate C-band, such a conversion is counted as two stages, and the other wavelength conversions are counted as one stage.

Further, in the comparative example, the S-band optical amplifier 11c is provided at each node 91 on the transmission path 90 to amplify the wavelength division multiplexing optical signal Sc, and the reception device 3 is also provided with an optical amplifier 32c that amplifies the wavelength division multiplexing optical signal Sc of the S-band. Therefore, the number of S-band optical amplifiers for wavelength division multiplexing optical signals Sa and Sb is 0, but the number of S-band optical amplifiers for wavelength division multiplexing optical signal Sc is $(3 \times N)$ units which is equal to the number of transmission spans.

In contrast, in this example, each of the relay devices 1a, 1b, and 1c amplifies any one of the wavelength division multiplexing optical signals Sa, Sb, and Sc by the optical amplifier 11c, and the reception device 3 amplifies the S-band wavelength division multiplexing optical signal Sb by the optical amplifier 32c. Thus, the wavelength division multiplexing optical signals Sa, Sb, and Sc are amplified only once per three transmission spans by the optical amplifiers 11c and 32c. Therefore, the number of times each of the wavelength division multiplexing optical signals Sa, Sb, and Sc is amplified is (3×N).

Further, in the comparative example, the number of transmission spans in the S-band of the wavelength division multiplexing optical signals Sa and Sb is 0, and the number of transmission spans in the S-band of the wavelength division multiplexing optical signal Sc is (3×N). In contrast, in this example, the number of transmission spans of the wavelength division multiplexing optical signals Sa, Sb, and Sc in the S-band is N as described above.

As described above, in this example, unlike the comparative example, the number of wavelength conversion stages of the S-band, the number of optical amplifications, and the number of transmission spans are averaged among the wavelength division multiplexing optical signals Sa, Sb, and Sc. Therefore, the transmission characteristics of the wavelength division multiplexing optical signals Sa, Sb, and Sc are also averaged, and the difference in transmission performance is reduced.

The number of transmission spans is not limited to this example, and may be a number other than 3×N.

Figure 4:
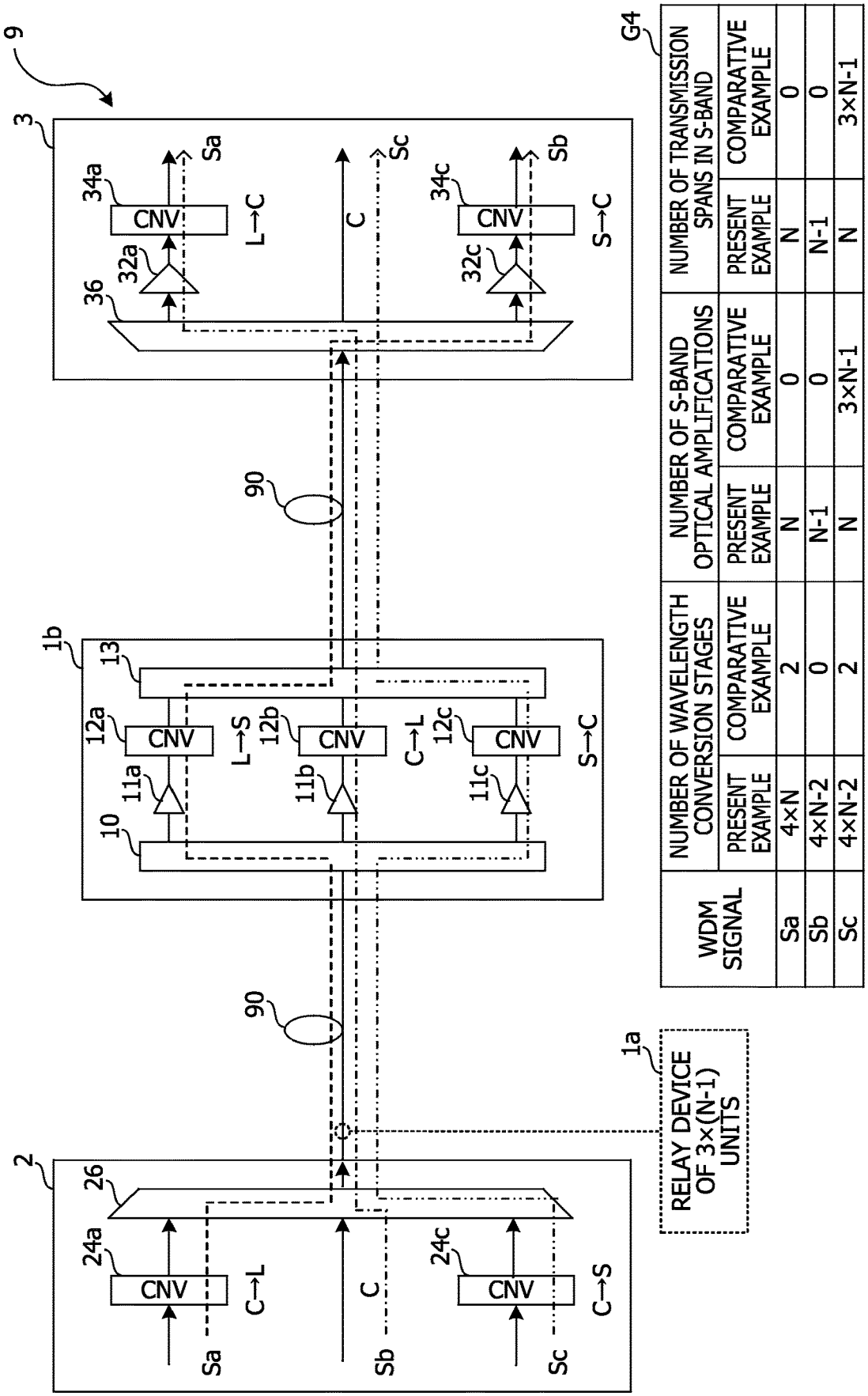
FIG. 4 is a configuration diagram illustrating a second example of a transmission system in which a relay device is provided so that the number of transmission spans is a number other than a multiple of the number of wavelength division multiplexing optical signals.

FIG. 4 is a configuration diagram illustrating a second example of the transmission system 9 in which the relay devices 1a and 1b are provided so that the number of transmission spans is a number other than a multiple of the number of wavelength division multiplexing optical signals Sa, Sb, and Sc. In FIG. 4, the same reference numerals are given to the configurations common to those in FIG. 3, and the description thereof will be omitted.

In this example, the transmission path 90 is divided into (3×N−1) transmission spans by relay device 1a of 3×(N−1) units and the relay device 1b. Therefore, the number of transmission spans is a number obtained by adding 2 to a multiple of the number of the wavelength division multiplexing optical signals Sa, Sb, and Sc. For example, when N=1, only one relay device 1b is provided on the transmission path 90, so that the number of transmission spans is 2.

The path of the wavelength division multiplexing optical signal Sa is indicated by a dotted line, the path of the wavelength division multiplexing optical signal Sb is indicated by a chain single-dashed line, and the path of the wavelength division multiplexing optical signal Sc is indicated by a chain double-dashed line. As may be understood from the paths of the wavelength division multiplexing optical signals Sa, Sb, and Sc, unlike the example of FIG. 3, the number of transmission spans for each wavelength band is not the same among the wavelength division multiplexing optical signals Sa, Sb, and Sc.

For example, when N=1, the number of transmission spans in one wavelength band among the C-band, L-band, and S-band is 0 for any of the wavelength division multiplexing optical signals Sa, Sb, and Sc, and the number of transmission spans in the remaining two wavelength bands is 2. For example, in the wavelength division multiplexing optical signal Sa, the number of transmission spans in the C-band is 0, and the number of transmission spans in the L-band and the S-band is 2.

To generalize this, since the number of transmission spans is (3×N−1), the number of transmission spans in one wavelength band is (N−1) for any of the wavelength division multiplexing optical signals Sa, Sb, and Sc, and the number of transmission spans in the remaining two wavelength bands is N. Therefore, as compared with the comparative example, the number of transmission spans for each wavelength band is averaged among the wavelength division multiplexing optical signals Sa, Sb, and Sc in this example as well.

A reference numeral "G4" indicates the number of wavelength conversion stages of the wavelength division multiplexing optical signals Sa, Sb, and Sc in this example and the comparative example of FIG. 1, the number of amplifications by the S-band optical amplifiers 11c and 32c, and the number of transmission spans in the S-band. Regarding the wavelength division multiplexing optical signal Sc, the number of optical amplifications and the number of transmission spans in the S-band of the comparative example are (3×N−1) because the number of transmission spans is (3×N−1).

In this example, the number of wavelength conversion stages of the wavelength division multiplexing optical signal Sa is (4×N), and the number of wavelength conversion stages of the wavelength division multiplexing optical signals Sb and Sc is (4×N−2). Further, as described above, since the wavelength conversion from the L-band to the S-band is a wavelength conversion beyond the intermediate C-band, such a conversion is counted as two stages, and the other wavelength conversions are counted as one stage.

In addition, in this example, the number of times of optical amplification of the S-band of the wavelength division multiplexing optical signals Sa and Sc is N times, and the number of the S-band optical amplifications of the wavelength division multiplexing optical signal Sb is (N−1) times. Therefore, the number of the S-band optical amplification of the wavelength division multiplexing optical signals Sa, Sb, and Sc is not the same, but the wavelength multiplexing optical signals Sa, Sb, and Sc are averaged as compared with the comparative example.

Further, in this example, the number of the S-band optical amplifications of the wavelength division multiplexing optical signals Sa and Sc is N times, and the number of the S-band optical amplifications of the wavelength division multiplexing optical signal Sb is (N−1) times. Therefore, the number of the S-band optical amplifications of the wavelength division multiplexing optical signals Sa, Sb, and Sc is not the same, but the wavelength multiplexing optical signals Sa, Sb, and Sc are averaged as compared with the comparative example.

Further, in this example, the number of transmission spans in the S-band of the wavelength division multiplexing optical signals Sa and Sc is N times, respectively, and the number of transmission spans in the S-band of the wavelength division multiplexing optical signal Sb is (N−1) times. Therefore, the number of transmission spans in the S-band of the wavelength division multiplexing optical signals Sa, Sb, and Sc is not the same, but the wavelength division multiplexing optical signals Sa, Sb, and Sc are averaged as compared with the comparative example.

As described above, in this example, unlike the comparative example, the number of wavelength conversion stages of the S-band, the number of optical amplifications, and the number of transmission spans are averaged among the wavelength division multiplexing optical signals Sa, Sb, and Sc. Therefore, the transmission characteristics of the wavelength division multiplexing optical signals Sa, Sb, and Sc are also averaged, and the difference in transmission performance is reduced.

Figure 5:
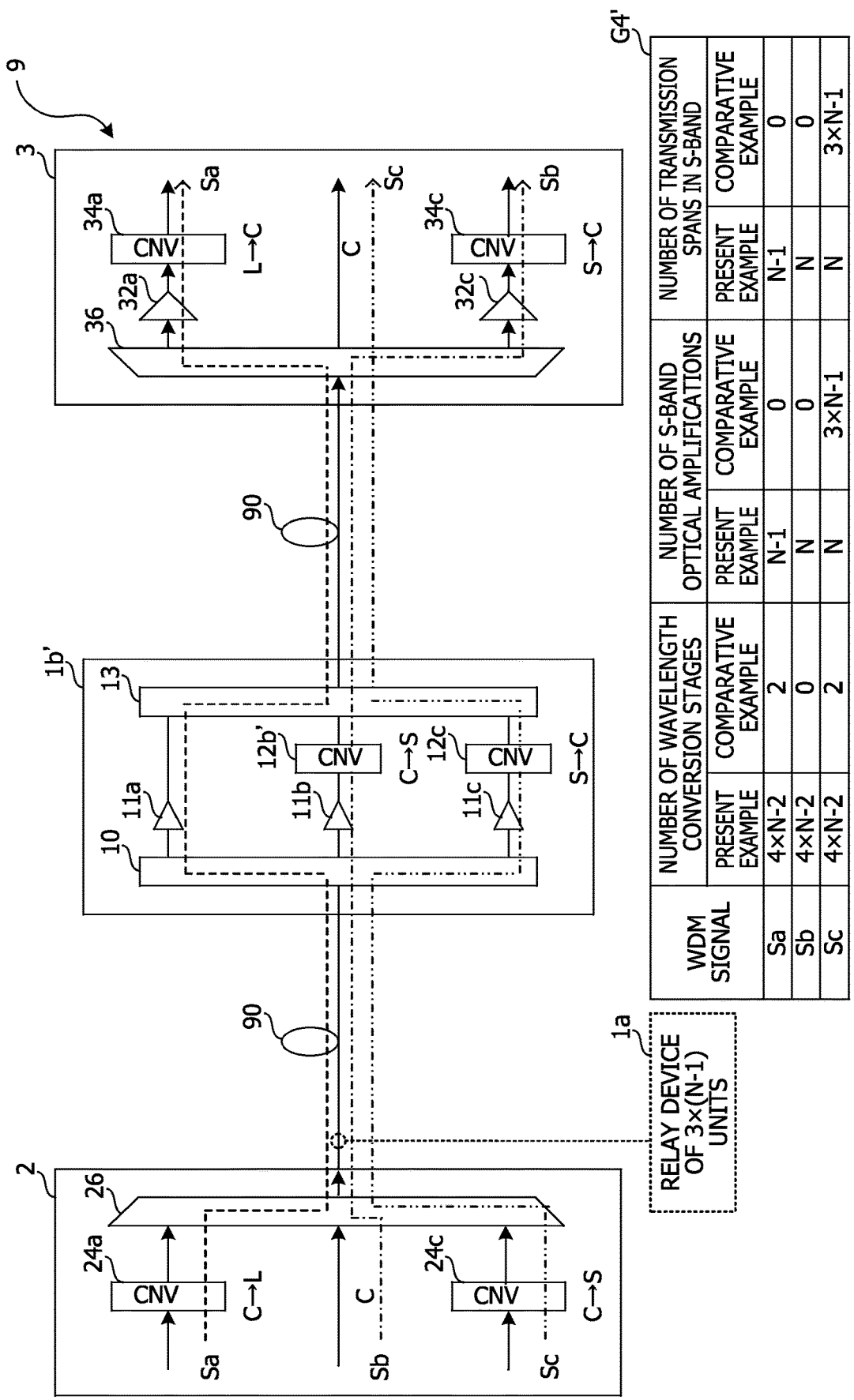
FIG. 5 is a configuration diagram illustrating a third example of a transmission system in which a relay device is provided so that the number of transmission spans is a number other than a multiple of the number of wavelength division multiplexing optical signals.

FIG. 5 is a configuration diagram illustrating a third example of a transmission system 9 in which the relay devices 1a and 1b are provided so that the number of transmission spans is a number other than a multiple of the number of the wavelength division multiplexing optical signals Sa, Sb, and Sc. In FIG. 5, the same reference numerals are given to the configurations common to those in FIG. 3, and the description thereof will be omitted.

The number of transmission spans in this example is (3×N−1) as in the example of FIG. 4, but a relay device 1b' is provided instead of the relay device 1b. The relay device 1b' includes a demultiplexer 10, optical amplifiers 11a, 11b, and 11c, wavelength converters 12b' and 12c, and a multiplexer 13. Also, the relay device 1b' is an example of a transmission device.

The relay device 1b' is not provided with a wavelength converter 12a that converts the wavelength band from the L-band to the S-band. Therefore, the relay device 1b' is provided with a wavelength converter 12bb' that converts the wavelength band from the C-band to the S-band instead of the wavelength converter 12b that converts the wavelength band from the C-band to the L-band.

Therefore, when the wavelength division multiplexing optical signal Sa is input to the relay device 1b, the optical signal Sa is transmitted to the reception device 3 while maintaining the wavelength band in the L-band. Further, when the wavelength division multiplexing optical signal Sb is input to the relay device 1b, the wavelength band is converted from the C-band to the S-band and transmitted to the reception device 3. Also, the position of the node 91 where the relay device 1b' is provided is not limited.

A reference numeral "G4'" indicates the number of wavelength division multiplexing stages of the wavelength division multiplexing optical signal (see the "WDM signal") Sa, Sb, and Sc in this example and the comparative example of FIG. 1, the number of amplifications by the S-band optical amplifiers 11c and 32c, and the number of transmission spans in the S-band.

In this example, the number of wavelength conversion stages of the wavelength division multiplexing optical signal Sa is two smaller (4×N−2) than the number of wavelength conversion stages in the example of FIG. 4 because there is no wavelength conversion in the relay device 1b.' Therefore, the number of wavelength conversion stages of the wavelength division multiplexing optical signals Sa, Sb, and Sc is the same, and the power loss due to the wavelength conversion is averaged among the wavelength division multiplexing optical signals Sa, Sb, and Sc as compared with the example of FIG. 4.

Further, the number of optical amplifications in the S-band of the wavelength division multiplexing optical signal Sa is (N−1), which is one smaller than the number of transmission spans in the example of FIG. 4, and the number of the S-band optical amplification of the wavelength division multiplexing optical signal Sb is N times, which is one larger than the number of transmission spans in the example of FIG. 4. Further, the number of transmission spans in the S-band of the wavelength division multiplexing optical signal Sa is one smaller (N−1) than the number of transmission spans in the example of FIG. 4, and the number of transmission spans in the S-band of the wavelength division multiplexing optical signal Sb is N, which is one larger than the number of transmission spans in the example of FIG. 4.

As described above, in this example as well, the number of wavelength conversion stages of the S-band, the number of optical amplifications, and the number of transmission spans are averaged among the wavelength division multiplexing optical signals Sa, Sb, and Sc, as in the example of FIG. 4. Therefore, the transmission characteristics of the wavelength division multiplexing optical signals Sa, Sb, and Sc are also averaged, and the difference in transmission performance is reduced.

Figure 6:
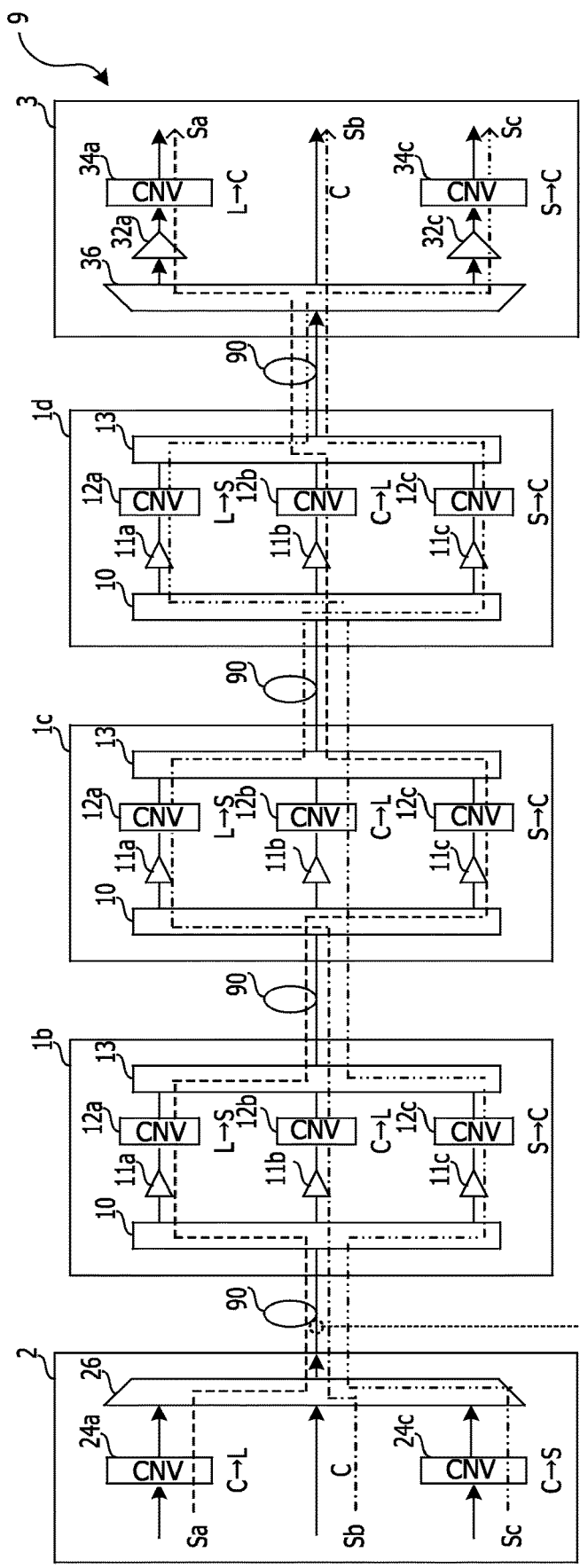
FIG. 6 is a configuration diagram illustrating a fourth example of a transmission system in which a relay device is provided so that the number of transmission spans is a number other than a multiple of the number of wavelength division multiplexing optical signals.

FIG. 6 is a configuration diagram illustrating a fourth example of a transmission system 9 in which the relay devices 1a and 1b are provided so that the number of transmission spans is a number other than a multiple of the number of wavelength division multiplexing optical signals Sa, Sb, and Sc. In FIG. 6, the same reference numerals are given to the configurations common to those in FIG. 3, and the description thereof will be omitted.

In this example, the transmission path 90 is divided into (3×N−2) transmission spans by the relay devices 1a of 3×(N−1) units and the relay devices 1b, 1c, and 1d. However, in this example, N is an integer of 2 or more.

The number of transmission spans is a number obtained by adding 1 to a multiple of the number of the wavelength division multiplexing optical signals Sa, Sb, and Sc. For example, when N=2, only three relay devices 1b, 1b, and 1c are provided on the transmission path 90, so that the number of transmission spans is four. Also, the relay device 1d has the same configuration as the other relay devices 1a, 1b, and 1c.

The path of the wavelength division multiplexing optical signal Sa is indicated by a dotted line, the path of the wavelength division multiplexing optical signal Sb is indicated by a chain single-dashed line, and the path of the wavelength division multiplexing optical signal Sc is indicated by a chain double-dashed line. As may be understood from the paths of the wavelength division multiplexing optical signals Sa, Sb, and Sc, unlike the example of FIG. 3, the number of transmission spans for each wavelength band is not the same among the wavelength division multiplexing optical signals Sa, Sb, and Sc.

For example, when N=2, the number of transmission spans in one wavelength band among the C-band, L-band, and S-band is 2 for all of the wavelength division multiplexing optical signals Sa, Sb, and Sc, and the number of transmission spans in the remaining two wavelength bands is 1. For example, in the case of the wavelength division multiplexing optical signal Sa, the number of transmission spans in the L-band is 2, and the number of transmission spans in the C-band and S-band is 1.

In general, since the number of transmission spans is (3×N−2), the number of transmission spans in one wavelength band is N for any of the wavelength division multiplexing optical signals Sa, Sb, and Sc, and the number of transmission spans in the remaining two wavelength bands is (N−1). Therefore, as compared with the comparative example, the number of transmission spans for each wavelength band is averaged among the wavelength division multiplexing optical signals Sa, Sb, and Sc in this example as well.

A reference numeral "G5" indicates the number of wavelength conversion stages of the wavelength division multiplexing optical signals Sa, Sb, and Sc in this example and the comparative example of FIG. 1, the number of amplifications by the S-band optical amplifiers 11c and 32c, and the number of transmission spans in the S-band. Regarding the wavelength division multiplexing optical signal Sc, the number of optical amplifications and the number of transmission spans in the S-band of the comparative example are (3×N−2) because the number of transmission spans is (3×N−2).

In this example, the number of wavelength conversion stages of the wavelength division multiplexing optical signals Sa and Sc is (4×N−2), and the number of wavelength conversion stages of the wavelength division multiplexing optical signal Sb is (4×N−4). Further, as described above, since the wavelength conversion from the L-band to the S-band is a wavelength conversion beyond the intermediate C-band, such a conversion is counted as two stages, and the other wavelength conversions are counted as one stage.

Further, in this example, the number of the S-band optical amplification of the wavelength division multiplexing optical signals Sa and Sb is (N−1) times, and the number of the S-band optical amplification of the wavelength division multiplexing optical signal Sc is N times. Therefore, the number of the S-band optical amplification of the wavelength division multiplexing optical signals Sa, Sb, and Sc is not the same, but the wavelength multiplexing optical signals Sa, Sb, and Sc are averaged as compared with the comparative example.

Further, in this example, the number of transmission spans in the S-band of the wavelength division multiplexing optical signals Sa and Sb is (N−1) times, respectively, and the number of transmission spans in the S-band of the wavelength division multiplexing optical signal Sc is N times. Therefore, the number of transmission spans in the S-band of the wavelength division multiplexing optical signals Sa, Sb, and Sc is not the same, but the wavelength division multiplexing optical signals Sa, Sb, and Sc are averaged as compared with the comparative example.

As described above, in this example, unlike the comparative example, the number of wavelength conversion stages of the S-band, the number of optical amplifications, and the number of transmission spans are averaged among the wavelength division multiplexing optical signals Sa, Sb, and Sc. Therefore, the transmission characteristics of the wavelength division multiplexing optical signals Sa, Sb, and Sc are also averaged, and the difference in transmission performance is reduced.

Figure 7:
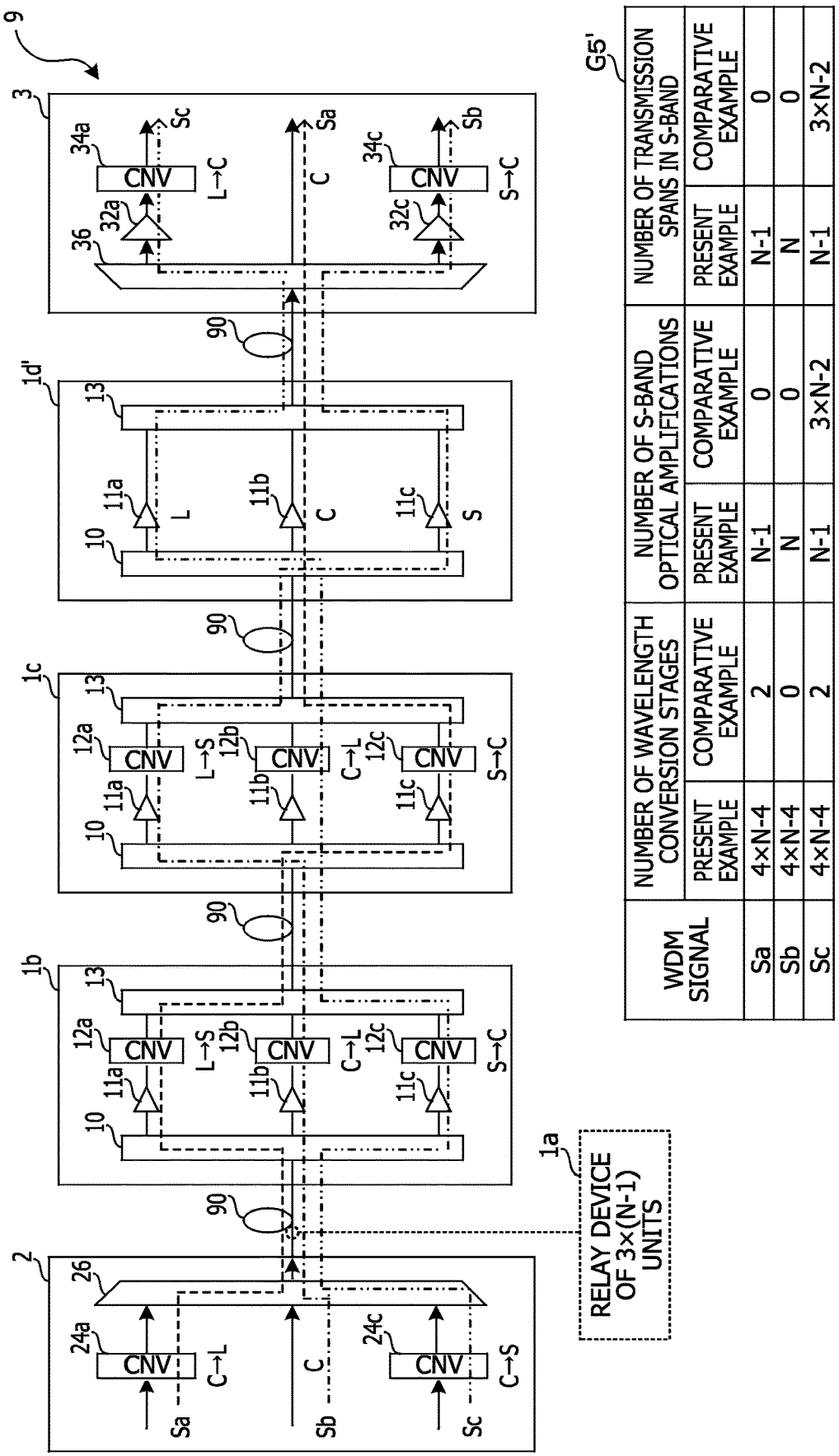
FIG. 7 is a configuration diagram illustrating a fifth example of a transmission system in which a relay device is provided so that the number of transmission spans is a number other than a multiple of the number of wavelength division multiplexing optical signals.

FIG. 7 is a configuration diagram illustrating a fifth example of a transmission system 9 in which the relay devices 1a and 1b are provided so that the number of transmission spans is a number other than a multiple of the number of wavelength division multiplexing optical signals Sa, Sb, and Sc. In FIG. 7, the same reference numerals are given to the configurations common to those in FIG. 3, and the description thereof will be omitted.

The number of transmission spans in this example is (3×N−2) as in the example of FIG. 6, but a relay device 1d' is provided instead of the relay device 1d. The relay device 1d' includes a demultiplexer 10, optical amplifiers 11a, 11b, and 11c, and a multiplexer 13. Unlike the other relay devices 1a, 1b, and 1c, the relay device 1d' is not provided with the wavelength converters 12a, 12b, and 12c.

Therefore, when the wavelength division multiplexing optical signal Sa is input to the relay device 1d,' such a signal is transmitted to the reception device 3 while maintaining the wavelength band in the C-band. Further, when the wavelength division multiplexing optical signal Sb is input to the relay device 1b, such a signal is transmitted to the reception device 3 while maintaining the wavelength band in the S-band. When the wavelength division multiplexing optical signal Sc is input to the relay device 1b, such a signal is transmitted to the reception device 3 while maintaining the wavelength band in the L-band. Also, the position of the node 91 on which the relay device 1d' is provided is not limited.

A reference numeral "G5'" indicates the number of wavelength division multiplexing stages of the wavelength division multiplexing optical signal (see the "WDM signal") Sa, Sb, Sc in this example and the comparative example of FIG. 1, the number of amplifications by the S-band optical amplifiers 11c and 32c, and the number of transmission spans in the S-band.

In this example, the number of wavelength conversion stages of the wavelength division multiplexing optical signals Sa and Sc is two smaller (4×N−2) than the number of wavelength conversion stages in the example of FIG. 6 because there is no wavelength conversion in the relay device 1d.' Further, the number of wavelength conversion stages of the wavelength division multiplexing optical signal Sb is the same as the example of FIG. 6 because the wavelength conversion of the wavelength converter 34c of the reception device 3 is added although there is no wavelength conversion in the relay device 1d.' Therefore, the number of wavelength conversion stages of the wavelength division multiplexing optical signals Sa, Sb, and Sc is the same, and the power loss due to the wavelength conversion is averaged among the wavelength division multiplexing optical signals Sa, Sb, and Sc as compared with the example of FIG. 6.

Further, the number of optical amplifications in the S-band of the wavelength division multiplexing optical signal Sb is N times, which is one larger than the number of optical amplifications in the example of FIG. 6, and the number of optical amplifications in the S-band of the wavelength division multiplexing optical signal Sc is one smaller (N−1) than the number of optical amplifications in the example of FIG. 6. In addition, the number of optical amplifications in the S-band of the wavelength division multiplexing optical signal Sa is the same (N−1) as the number of optical amplifications in the example of FIG. 6.

Further, the number of transmission spans in the S-band of the wavelength division multiplexing optical signal Sc is one smaller (N−1) than the number of transmission spans in the example of FIG. 6, and the number of transmission spans in the S-band of the wavelength division multiplexing optical signal Sb is N, which is one larger than the number of transmission spans in the example of FIG. 6. Further, the number of transmission spans in the S-band of the wavelength division multiplexing optical signal Sa is the same (N−1) as the number of transmission spans in the example of FIG. 6.

As described above, in this example as well, the number of wavelength conversion stages of the S-band, the number of optical amplifications, and the number of transmission spans are averaged among the wavelength division multiplexing optical signals Sa, Sb, and Sc, as in the example of FIG. 6. Therefore, the transmission characteristics of the wavelength division multiplexing optical signals Sa, Sb, and Sc are also averaged, and the difference in transmission performance is reduced.

[Design of Transmission Span Number]

The number of transmission spans of the transmission path 90 may be determined, for example, within a range satisfying the following equation (1).

$$\alpha + \beta > 0 \quad (1)$$

In the equation (1), $\alpha$ refers to the conversion efficiency (dB) of the wavelength converters 12a, 12b, 12b', and 12c, and $\beta$ refers to the power (DB) of the wavelength division multiplexing optical signals Sa, Sb, and Sc improved by averaging the transmission characteristics. The power β is calculated from, for example, the difference in gain and NF according to the wavelength band of the optical amplifiers 11a, 11b, and 11c, the loss per transmission span, and the like.

[Example of a Relay Device that Converts the Wavelength Band in Two Steps]

Figure 8:
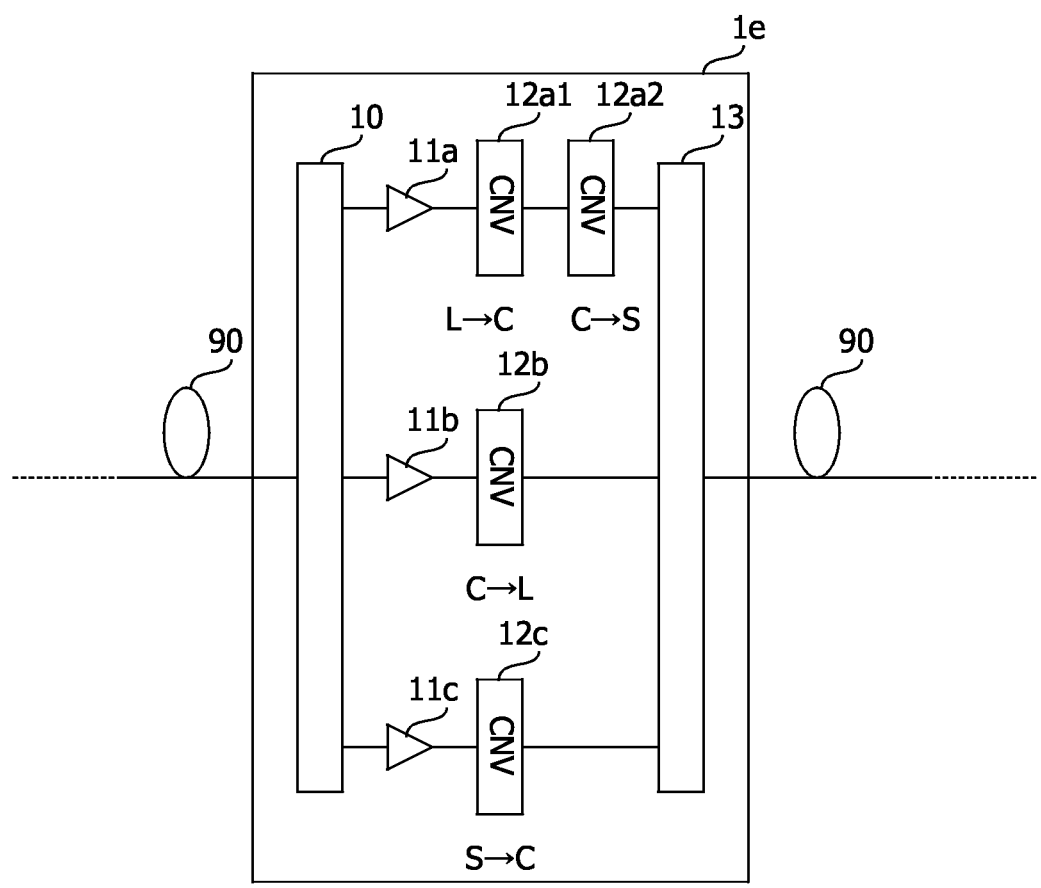
FIG. 8 is a configuration diagram illustrating an example of a relay device that converts a wavelength band in two steps.

FIG. 8 is a configuration diagram illustrating an example of a relay device he that converts a wavelength band in two steps. In FIG. 8, the same reference numerals are given to the configurations common to those in FIG. 3, and the description thereof will be omitted.

The relay device 1e is provided at the node 91 instead of the above-mentioned relay devices 1a, 1b, 1c, and 1d. Unlike the relay devices 1a, 1b, 1c, and 1d, the relay device 1e includes two wavelength converters 12a1 and 12a2 instead of the wavelength converter 12a. One wavelength converter 12a1 converts the wavelength band of the wavelength division multiplexing optical signals Sa, Sb, and Sc from the L-band to the C-band, and the other wavelength converter 12a2 converts the wavelength bands of the wavelength division multiplexing optical signals Sa, Sb, and Sc from the C-band to the L-band.

Therefore, the wavelength bands of the wavelength division multiplexing optical signals Sa, Sb, and Sc are converted from the C-band to the S-band by a two-step wavelength conversion. Therefore, it becomes possible to perform a more accurate wavelength conversion than when converting the wavelength bands of the wavelength division multiplexing optical signals Sa, Sb, and Sc from the C-band to the S-band by a single wavelength conversion. Also, the number of wavelength conversion stages is not limited to two and may be three or more. Further, the relay device he executes the conversion of the wavelength band from the L-band to the C-band in two steps, but the present disclosure is not limited thereto, and the conversion between other wavelength bands may be executed through a plurality of steps.

[Example of Wavelength Conversion Among Four Wavelength Bands]

In the examples so far, examples of the wavelength conversion of the wavelength division multiplexing optical signals Sa, Sb, and Sc in three wavelength bands have been given, but the number of wavelength bands is not limited. For example, the wavelength conversion may be performed among four wavelength bands of L-band, C-band, S-band, and E band.

Figure 9:
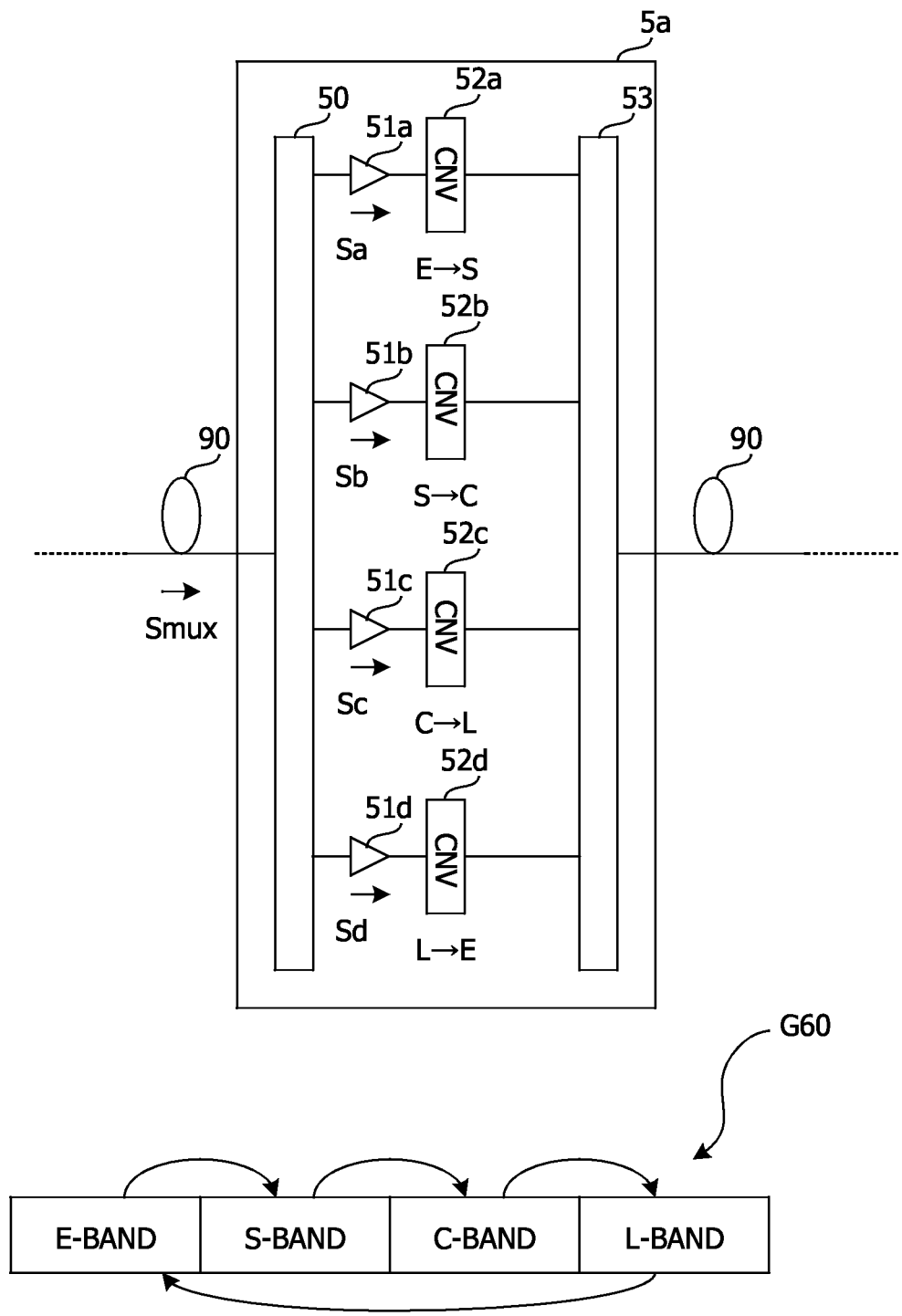
FIG. 9 illustrates an example of a relay device that performs a wavelength conversion among four wavelength bands.

FIG. 9 is an example of a relay device 5a that performs a wavelength conversion among four wavelength bands. The relay device 5a is provided in each node 91 in the same manner as the relay devices 1a to 1d. The relay device 5a transmits the wavelength division multiplexing optical signals Sa, Sb, Sc, and Sd of the E band, S-band, C-band, and L-band from the transmission device 2 to the reception device 3.

The relay device 5a includes a demultiplexer 50 such as a WDM filter, optical amplifiers 51a, 51b, 51c, and 51d, wavelength converters 52a, 52b, 52c, and 52d, and a multiplexer 53 such as an optical coupler. Also, the relay device 5a is an example of a transmission device.

The demultiplexer 50 is an example of a separation unit, and separates each of the wavelength division multiplexing optical signals Sa, Sb, Sc, and Sd from the multiplexed light Smux of the wavelength division multiplexing optical signals Sa, Sb, and Sc. The demultiplexer 50 outputs the wavelength division multiplexing optical signals Sa, Sb, Sc, and Sd from separate output ports according to the wavelength band to the optical amplifiers 51a, 51b, 51c, and 51d corresponding to the wavelength band, respectively.

The optical amplifier 51a amplifies the E-band wavelength division multiplexing optical signal Sa, and the optical amplifier 51b amplifies the S-band wavelength division multiplexing optical signal Sb. Further, the optical amplifier 51c amplifies the C-band wavelength division multiplexing optical signal Sc, and the optical amplifier 51d amplifies the L-band wavelength division multiplexing optical signal Sd. The optical amplifiers 51a, 51b, 51c, and 51d output the amplified wavelength division multiplexing optical signals Sa, Sb, Sc, and Sd to the wavelength converters 12a, 12b, and 12c, respectively.

In addition, FIG. 9 illustrates a case where the wavelength bands of the wavelength division multiplexing optical signals Sa, Sb, Sc, and Sd are the E band, the S-band, the C-band, and the L-band, respectively, as an example. The wavelength bands of the wavelength division multiplexing optical signals Sa, Sb, Sc, and Sd are different for each node 91 as in the above-described embodiment in the case of the three wavelength bands. Therefore, the wavelength division multiplexing optical signals Sa, Sb, Sc, and Sd input to the optical amplifiers 51a, 51b, 51c, and 51d are determined according to their respective paths.

The wavelength converter 52a converts the E-band wavelength division multiplexing optical signal Sa into the S-band wavelength division multiplexing optical signal Sa. The wavelength converter 52b converts the S-band wavelength division multiplexing optical signal Sb into the C-band wavelength division multiplexing optical signal Sb. The wavelength converter 52c converts the C-band wavelength division multiplexing optical signal Sc into the L-band wavelength division multiplexing optical signal Sc. The wavelength converter 52d converts the L-band wavelength division multiplexing optical signal Sd into the E-band wavelength division multiplexing optical signal Sd.

In this way, the wavelength converters 52a, 52b, 52c, and 52d convert each wavelength band of the amplified wavelength division multiplexing optical signals Sa, Sb, Sc, and Sd into other wavelength bands of the wavelength division multiplexing optical signals Sa, Sb, Sc, and Sd so that the wavelength multiplex optical signals Sa, Sb, Sc, and Sd do not overlap in the wavelength band. Also, the wavelength converters 52a, 52b, 52c, and 52d are examples of wavelength converters.

The multiplexer 53 is an example of a multiplexer, and multiplexes wavelength division multiplexing optical signals Sa, Sb, Sc, and Sd whose wavelength band has been converted by the wavelength converters 52a, 52b, 52c, and 52d. Therefore, the wavelength division multiplexing optical signals Sa, Sb, Sc, and Sd are again transmitted as multiplexed light to the relay device 5a or the reception device 3 of the node 91 in the subsequent stage.

With the above configuration, the relay device 5a may convert the wavelength bands of the wavelength division multiplexing optical signals Sa, Sb, Sc, and Sd in the order indicated by a reference numeral "G60." The wavelength bands of the wavelength division multiplexing optical signals Sa, Sb, Sc, and Sd are converted by the relay device 5a of each node 91 in the order of cycling from the E-band to S-band, from the S-band to C-band, from the C-band to L-band, and from the L-band to E-band. Also, the order of wavelength conversion is not limited thereto.

Figure 10:
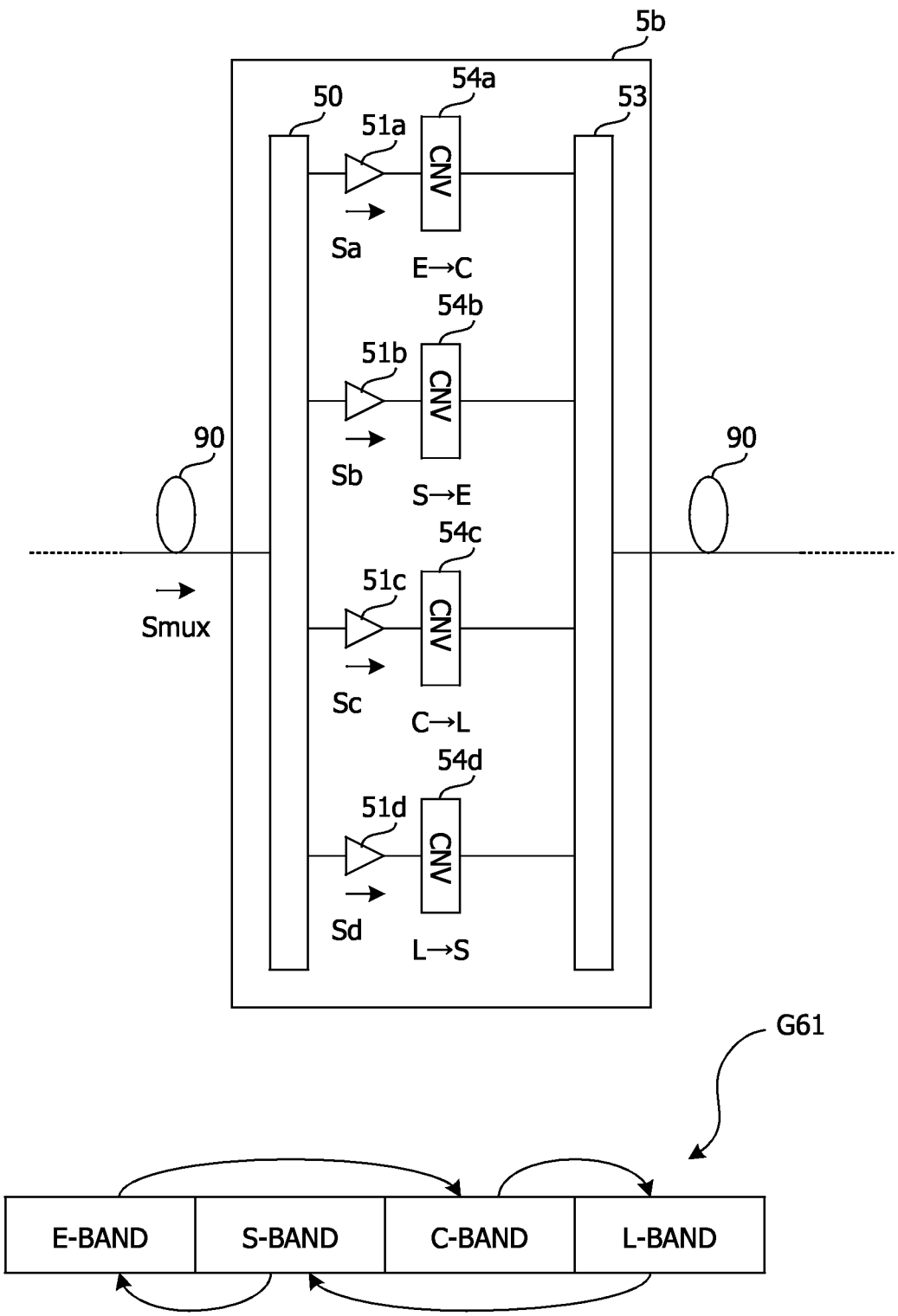
FIG. 10 illustrates an example of another relay device that performs a wavelength conversion among four wavelength bands.

FIG. 10 is an example of another relay device 5b that performs a wavelength conversion among four wavelength bands. In FIG. 10, the same reference numerals are given to the configurations common to those in FIG. 9, and the description thereof will be omitted.

The relay device 5b is provided in each node 91 in the same manner as the relay devices 1a to 1d. The relay device 5b transmits the wavelength division multiplexing optical signals Sa, Sb, Sc, and Sd of the E band, S-band, C-band, and L-band from the transmission device 2 to the reception device 3.

The relay device 5b includes wavelength converters 54a, 54b, 54c, and 54d instead of the wavelength converters 52a, 52b, 52c, and 52d. The wavelength converter 54a converts the E-band wavelength division multiplexing optical signal Sa from the optical amplifier 51a into the C-band wavelength division multiplexing optical signal Sa. The wavelength converter 54b converts the S-band wavelength division multiplexing optical signal Sb from the optical amplifier 51b into the E-band wavelength division multiplexing optical signal Sb. The wavelength converter 54c converts the C-band wavelength division multiplexing optical signal Sc into the L-band wavelength division multiplexing optical signal Sc. The wavelength converter 54d converts the L-band wavelength division multiplexing optical signal Sd into the S-band wavelength division multiplexing optical signal Sd.

With the above configuration, the relay device 5b may convert the wavelength bands of the wavelength division multiplexing optical signals Sa, Sb, Sc, and Sd in the order indicated by the reference numeral "G61." The wavelength bands of the wavelength division multiplexing optical signals Sa, Sb, Sc, and Sd are converted by the relay device 5a of each node 91 in the order of one cycle from the E band to the C-band, from the C-band to the L-band, from the L-band to the S-band, and from the S-band to the E band.

As described above, since the relay device 5b does not perform a wavelength conversion (conversion from L-band to E band) across two or more wavelength bands on the wavelength axis as in the relay device 5a, the accuracy of wavelength conversion may be improved as compared with the relay device 5a.

As described above, the relay devices 1a to 1d, 1b', 5a, and 5b have wavelength converters 12a, 12b, 12b', 12c, 52a to 52d, and 54a to 54d. The wavelength converters 12a, 12b, 12b', 12c, 52a to 52d, 54a to 54c, and 54 convert each wavelength band of at least a part of the wavelength division multiplexing optical signals Sa, Sb, Sc, and Sd into another wavelength band of a part of the wavelength division multiplexing optical signal, so that the wavelength multiplex optical signals Sa, Sb, Sc, and Sd do not overlap in the wavelength band.

Therefore, in the relay devices 1a to 1d, 1b', 5a, and 5b, the wavelength bands of the wavelength division multiplexing optical signals Sa, Sb, Sc, and Sd may be different for each transmission span. Therefore, the relay devices 1a to 1d, 1b', 5a, and 5b may reduce the difference in transmission characteristics for each wavelength band, and reduce the difference in transmission performance among wavelength division multiplexing optical signals Sa, Sb, Sc, and Sd.

[Control of Wavelength Conversion Switching]

The relay devices 1a to 1d, 1b', 5a, and 5b described above do not control the switching of the wavelength conversion of the wavelength division multiplexing optical signals Sa, Sb, Sc, and Sd, but may have a function of controlling the switching of wavelength conversion.

Figure 11:
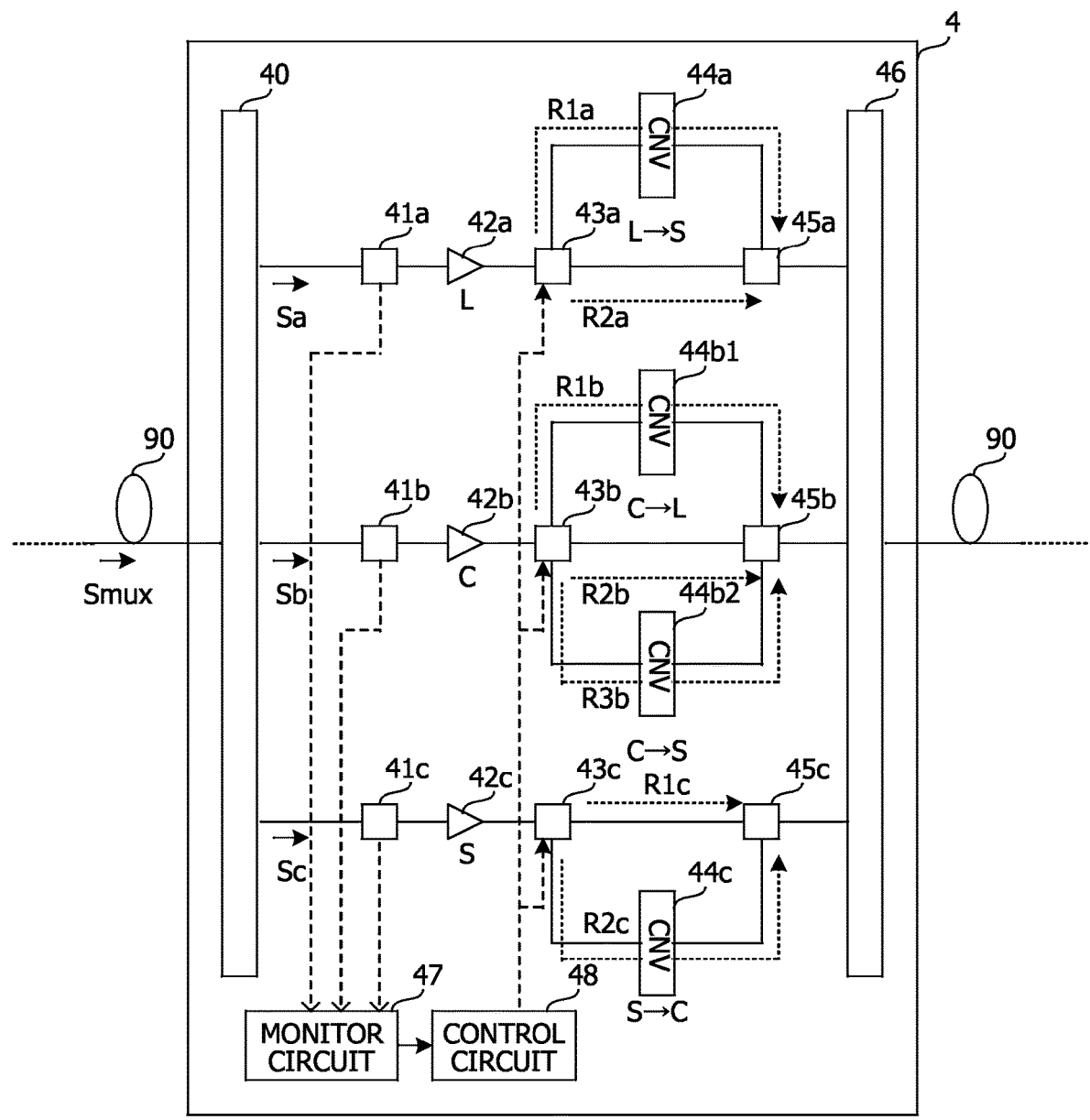
FIG. 11 is a configuration diagram illustrating an example of a relay device having a function of controlling the switching of wavelength conversion.

FIG. 11 is a configuration diagram illustrating an example of a relay device 4 having a function of controlling the switching of wavelength conversion. The relay device 4 is provided at each node 91 on the transmission path 90. The relay device 4 transmits the wavelength division multiplexing optical signals Sa, Sb, and Sc of the S-band, C-band, and L-band from the transmission device 2 to the reception device 3.

The relay device 4 includes a demultiplexer 40 such as a WDM filter, taps 41a, 41b, and 41c such as an optical splitter, optical amplifiers 42a, 42b, and 42c, optical switches 43a, 43b, and 43c, wavelength converters 44a, 44b1, 44b2, and 44c, optical couplers 45a, 45b, and 45c, and a multiplexer 46. Also, the relay device 4 is another example of a transmission device.

The demultiplexer 40 is an example of a separation unit, and separates each of the wavelength division multiplexing optical signals Sa, Sb, and Sc from the multiplexed light Smux of the wavelength division multiplexing optical signals Sa, Sb, and Sc. The demultiplexer 40 outputs each of the wavelength division multiplexing optical signals Sa, Sb, and Sc from separate output ports according to the wavelength band to the optical amplifiers 42a, 42b, and 42c according to the wavelength band via the taps 41a, 41b, and 41c.

As an example, it is assumed that the wavelength band of the wavelength division multiplexing optical signal Sa is the L-band, the wavelength band of the wavelength division multiplexing optical signal Sb is the C-band, and the wavelength band of the wavelength division multiplexing optical signal Sc is the S-band. The wavelength division multiplexing optical signals Sa, Sb, and Sc are input to the optical amplifiers 42a, 42b, and 42c, respectively. The optical amplifiers 42a, 42b, and 42c amplify the wavelength division multiplexing optical signals Sa, Sb, and Sc, respectively, and output the amplified signals to the optical switches 43a, 43b, and 43c.

The optical switch 43a selects paths R1a and R2a of the output destination of the wavelength division multiplexing optical signal Sa according to the control of a control circuit 48. The path R1a is a path from the optical switch 43a to the multiplexer 46 via the wavelength converter 44a and the optical coupler 45a, and the path R2b is a path from the optical switch 43a to the multiplexer 46 via the optical coupler 45a. The wavelength converter 44a converts the wavelength band of the wavelength division multiplexing optical signal Sa from the L-band to the S-band. Further, another optical switch that switches the paths R1a and R2a in conjunction with the optical switch 43a may be provided instead of the optical coupler 45a.

The optical switch 43b selects paths R1b, R2b, and R3b of the output destination of the wavelength division multiplexing optical signal Sb according to the control of the control circuit 48. The path R1b is a path from the optical switch 43b to the multiplexer 46 via the wavelength converter 44b1 and the optical coupler 45b, and the path R2b is a path from the optical switch 43b to the multiplexer 46 via the optical coupler 45b. The path R3b is a path from the optical switch 43b to the multiplexer 46 via the wavelength converter 44b2 and the optical coupler 45b.

The wavelength converter 44b1 converts the wavelength band of the wavelength division multiplexing optical signal Sb from the C-band to the L-band, and the wavelength converter 44b2 converts the wavelength band of the wavelength division multiplexing optical signal Sb from the C-band to the S-band. Further, another optical switch that switches R1b, R2b, and R3b in conjunction with the optical switch 43b may be provided instead of the optical coupler 45b.

The optical switch 43c selects paths R1c and R2c of the output destination of the wavelength division multiplexing optical signal Sc according to the control of the control circuit 48. The path R2c is a path from the optical switch 43c to the multiplexer 46 via the wavelength converter 44c and the optical coupler 45c, and the path R1c is a path from the optical switch 43c to the multiplexer 46 via the optical coupler 45c. The wavelength converter 44c converts the wavelength band of the wavelength division multiplexing optical signal Sc from the S-band to the C-band. Also, another optical switch that switches the paths R1c and R2c in conjunction with the optical switch 43c may be provided instead of the optical coupler 45c.

The multiplexer 46 is an example of a multiplexing unit, and multiplexes wavelength multiplex optical signals Sa, Sb, and Sc whose wavelength band has been converted by the wavelength converters 12a, 12b, and 12c. Therefore, the wavelength division multiplexing optical signals Sa, Sb, and Sc are again transmitted as multiplexed light to the relay device 4 or the reception device 3 of the node 91 in the subsequent stage.

The tap 41a branches the wavelength division multiplexing optical signal Sa into the optical amplifier 42a and a monitor circuit 47. The tap 41b branches the wavelength division multiplexing optical signal Sb into the optical amplifier 42b and the monitor circuit 47. The tap 41c branches the wavelength division multiplexing optical signal Sc into the optical amplifier 42c and the monitor circuit 47.

The monitor circuit 47 detects the power of the wavelength division multiplexing optical signals Sa, Sb, and Sc, respectively, input from the taps 41a, 41b, and 41c by, for example, a photodiode. The control circuit 48 acquires the detected values of the powers of the wavelength division multiplexing optical signals Sa, Sb, and Sc from the monitor circuit 47.

The control circuit 48 is a circuit including, for example, a processor such as a central processing unit (CPU), a memory, a field programmable gate array (FPGA), an application specified integrated circuit (ASIC), and the like. The control circuit 48 controls the optical switches 43a, 43b, and 43c, respectively, so that the power difference among the wavelength division multiplexing optical signals Sa, Sb, and Sc is reduced. As a result, the relay device 4 reduces the difference in transmission characteristics among the wavelength division multiplexing optical signals Sa, Sb, and Sc for each node 91.

FIG. 12 is a diagram illustrating control examples #1 to #3 of the optical switches 43a, 43b, and 43c. In FIG. 12, for each of the control examples #1 to #3, the wavelength bands of the wavelength division multiplexing optical signals Sa, Sb, and Sc, the relative level of power, the identifiers (codes) of the optical switches 43a, 43b, and 43c to be controlled, and the identifiers (codes) of the paths R1a, R2a, R1b, R2b, R3b, R1c, and R2c are illustrated in association with each other.

The control example #1 is an example in which the power of the L-band wavelength division multiplexing optical signal Sa is the highest and the power of the S-band wavelength division multiplexing optical signal Sc is the lowest. The control circuit 48 causes the optical switch 43a to select the path R1a, causes the optical switch 43b to select the path R1b, and causes the optical switch 43c to select the path R2c. As a result, the relay device 4 may perform the same wavelength conversion as the above-mentioned relay devices 1a to 1d.

The control example #2 is an example in which the power of the C-band wavelength division multiplexing optical signal Sb is the highest and the power of the S-band wavelength division multiplexing optical signal Sc is the lowest. The control circuit 48 causes the optical switch 43a to select the path R2a, causes the optical switch 43b to select the path R3b, and causes the optical switch 43c to select the path R2c. As a result, the relay device 4 may perform the same wavelength conversion as the above-mentioned relay device 1b'.

The control example #3 is an example in which the power of the S-band wavelength division multiplexing optical signal Sc is the highest. The control circuit 48 causes the optical switch 43a to select the path R2a, causes the optical switch 43b to select the path R2b, and causes the optical switch 43c to select the path R1c. As a result, the relay device 4 may only perform an amplification without performing a wavelength conversion, similarly to the above-mentioned relay device 1d'.

In this way, since the relay device 4 switches the wavelength conversion according to the power of the wavelength division multiplexing optical signals Sa, Sb, and Sc, the transmission system 9 as illustrated in FIGS. 3 to 7 may be configured. Therefore, it is possible to reduce the difference in transmission characteristics between the wavelength division multiplexing optical signals Sa, Sb, and Sc.

Further, the control circuit 4 may control the optical switches 43a, 43b, and 43c according to the detection result, such as an optical signal-to-noise ratio (OSNR) or bit error rate (BER) of the wavelength division multiplexing optical signals Sa, Sb, and Sc, instead of the power of the wavelength division multiplexing optical signals Sa, Sb, and Sc. Also, the monitor circuit 47 is an example of a detection unit that detects the transmission characteristics of the wavelength division multiplexing optical signals Sa, Sb, and Sc. Further, the control circuit 48 is an example of a control unit that controls the optical switches 43a, 43b, and 43c, respectively, so that the difference in the transmission characteristics of the transmission characteristics of the wavelength division multiplexing optical signals Sa, Sb, and Sc is reduced.

[Configuration Example of Wavelength Converter]

Figure 13:
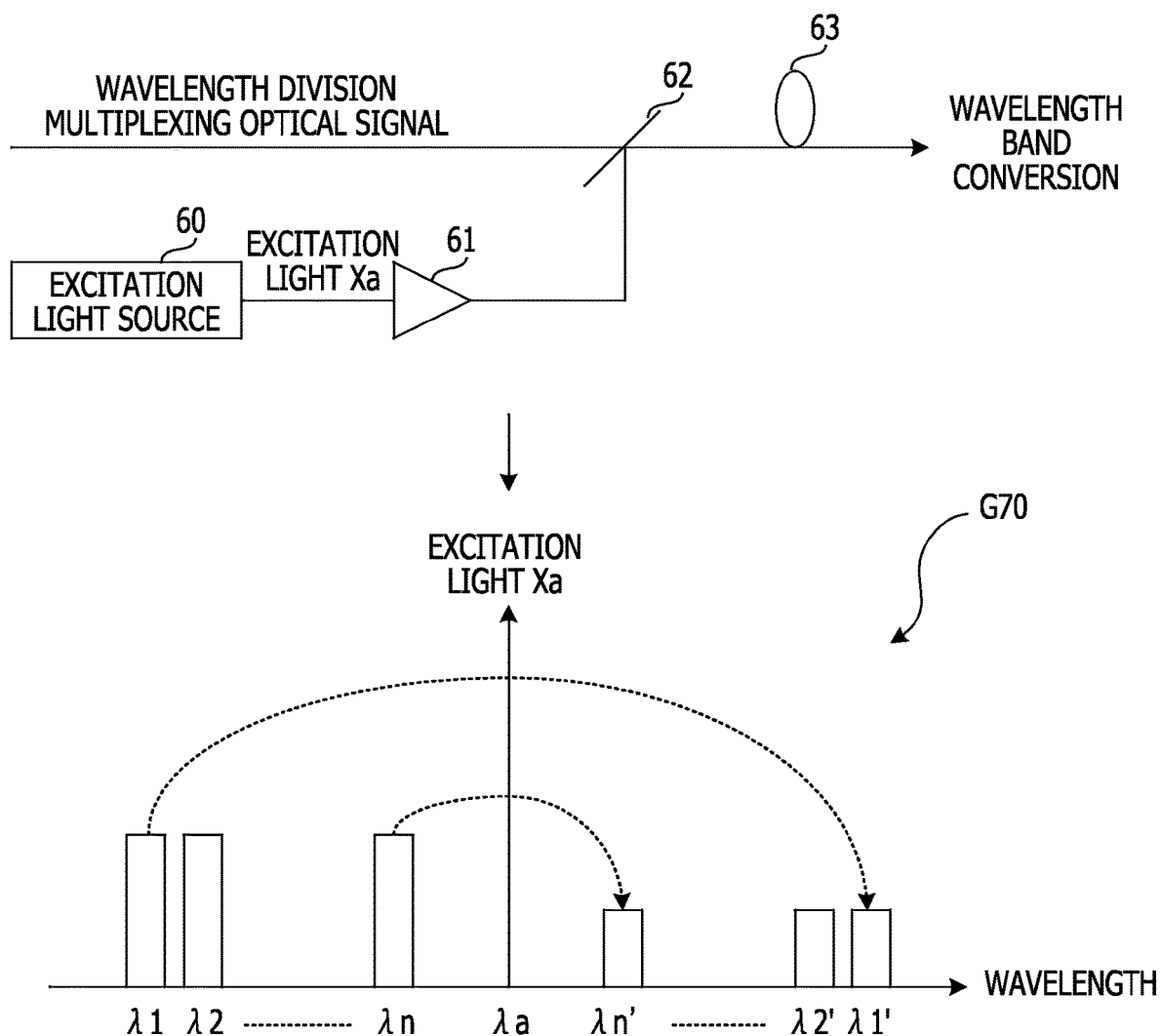
FIG. 13 is a configuration diagram illustrating an example of a wavelength converter including a single excitation light source.

FIG. 13 is a configuration diagram illustrating an example of wavelength converters 12a to 12c, 12b', 44a to 44c, 52a to 52c, and 54a to 54c provided with a single excitation light source 60. The wavelength converters 12a to 12c, 12b', 44a to 44c, 52a to 52c, and 54a to 54c include an excitation light source 60, an optical amplifier 61, an optical coupler 62, and a non-linear optical medium 63.

The excitation light source 60 outputs excitation light Xa. The optical amplifier 61 amplifies the excitation light Xa and outputs the light to the optical coupler 62. The wavelength division multiplexing optical signals Sa to Sd and the excitation light Xa are input to the optical coupler 62. The optical coupler 62 multiplexes the wavelength division multiplexing optical signals Sa to Sd and the excitation light Xa and outputs the signals and light to the non-linear optical medium 63. The non-linear optical medium 63 generates degenerate four-wave mixing of the wavelength division multiplexing optical signals Sa to Sd and the excitation light Xa. The idler light generated by the degenerate four-wave mixing is output as wavelength-converted wavelength division multiplexing optical signals Sa to Sd.

The reference numeral "G70" indicates an example of wavelength conversion according to this configuration. The wavelengths $\lambda 1, \lambda 2, \ldots, \lambda n$ of each optical signal wavelength-multiplexed with the wavelength division multiplexing optical signals Sa to Sd are converted into wavelengths $\lambda 1', \lambda 2', \ldots, \lambda n'$ at symmetrical positions sandwiching the center wavelength $\lambda a$ of the excitation light Xa on the wavelength axis. As a result, the arrangement order of the wavelengths λ1, λ2, ..., λn of each optical signal wavelength-multiplexed with the wavelength division multiplexing optical signals Sa to Sd is reversed. For example, the wavelength λ1 on the shortest wavelength side is converted to the wavelength λ1' on the longest wavelength side, and for example, the wavelength λn on the longest wavelength side is converted to the wavelength λn' on the shortest wavelength side.

Figure 14:
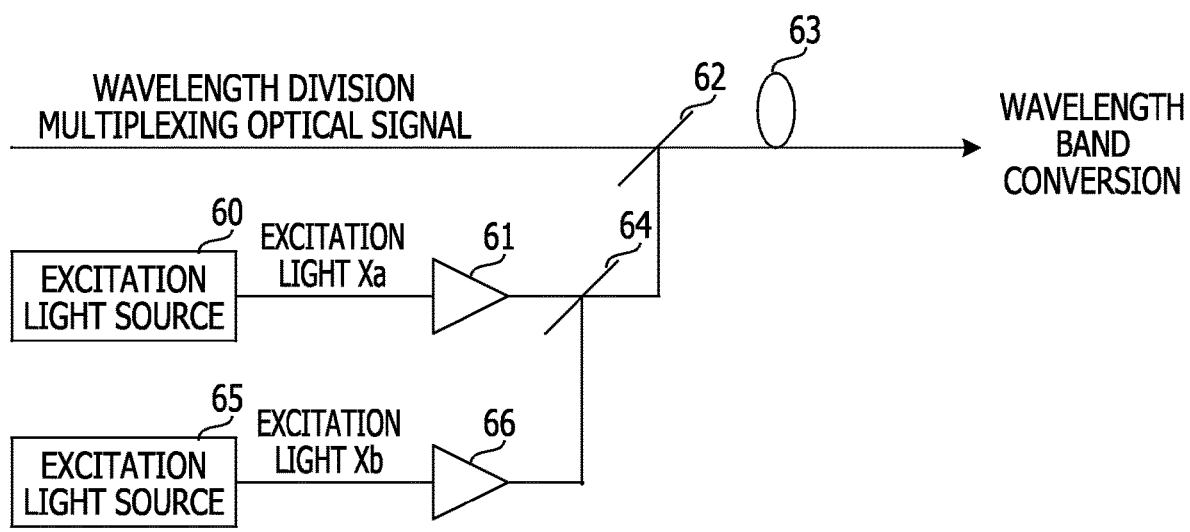
FIG. 14 is a configuration diagram illustrating an example of a wavelength converter including two excitation light sources.

FIG. 14 is a configuration diagram illustrating an example of wavelength converters 12a to 12c, 12b', 44a to 44c, 52a to 52c, and 54a to 54c provided with two excitation light sources 60 and 65. In FIG. 14, the same reference numerals are given to the configurations common to those in FIG. 13, and the description thereof will be omitted. The wavelength converters 12a to 12c, 12b', 44a to 44c, 52a to 52c, and 54a to 54c include excitation light sources 60 and 65, optical amplifiers 61 and 66, optical couplers 64 and 62, and a non-linear optical medium 63.

The excitation light source 65 outputs excitation light Xb. The optical amplifier 66 amplifies the excitation light Xb and outputs the light to the optical coupler 64. Excitation light Xa is input to the optical coupler 64 from the optical amplifier 61, and the excitation light Xb is input from the optical amplifier 66. The excitation lights Xa and Xb are multiplexed by the optical coupler 64 and input to the optical coupler 62.

The wavelength division multiplexing optical signals Sa to Sd and the excitation lights Xa and Xb are input to the optical coupler 62. The optical coupler 62 multiplexes the wavelength division multiplexing optical signals Sa to Sd and the excitation lights Xa and Xb, and outputs the signals and lights to the non-linear optical medium 63. The non-linear optical medium 63 generates non-degenerate four-wave mixing of wavelength division multiplexing optical signals Sa to Sd and excitation lights Xa and Xb. The idler light generated by the non-degenerate four-wave mixing is output as wavelength-converted wavelength division multiplexing optical signals Sa to Sd.

Figure 15:
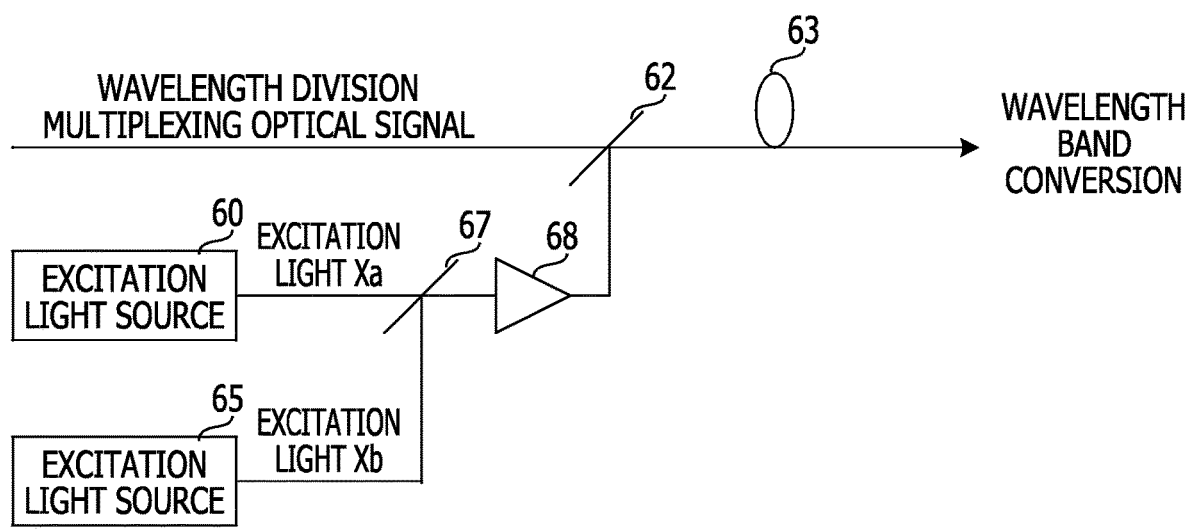
FIG. 15 is a configuration diagram illustrating another example of a wavelength converter having two excitation light sources.

FIG. 15 is a configuration diagram illustrating another example of wavelength converters 12a to 12c, 12b', 44a to 44c, 52a to 52c, and 54a to 54c provided with two excitation light sources 60 and 65. In FIG. 15, the same reference numerals are given to the configurations common to those in FIG. 14, and the description thereof will be omitted. The wavelength converters 12a to 12c, 12b', 44a to 44c, 52a to 52c, and 54a to 54c include excitation light sources 60 and 65, an optical amplifier 68, optical couplers 62 and 67, and a non-linear optical medium 63.

In this example, unlike the example of FIG. 14, the excitation lights Xa and Xb are input to the optical coupler 67 and multiplexed before being amplified by the optical amplifier 68. The multiplexed light of the excitation lights Xa and Xb is input from the optical coupler 67 to the optical amplifier 68 and amplified. In this example as well, the idler light generated by the non-degenerate four-wave mixing in the non-linear optical medium 63 is output as wavelength-converted wavelength division multiplexing optical signals Sa to Sd, as in the example of FIG. 14.

FIG. 16 is a diagram illustrating an example of wavelength conversion by wavelength converters 12a to 12c, 12b', 44a to 44c, 52a to 52c, and 54a to 54c provided with two excitation light sources 60 and 65. In this example, the wavelength band on the short wavelength side (λ1, λ2, ..., λn) is converted to the wavelength band on the long wavelength side (λ1', λ2', ..., λn'), such as a conversion from the C-band to the L-band, is given as an example. Further, the polarizations of the two excitation lights Xa and Xb are orthogonal to each other. Also, the polarization of the wavelength division multiplexing optical signals Sa to Sd is arbitrary.

The reference numeral "G71" indicates an example in which the wavelength bands (λ1, λ2, ..., λn) of the wavelength division multiplexing optical signals Sa to Sd before conversion are located on the shorter wavelength side of the center wavelengths λa and λb of the excitation lights Xa and Xb, and the wavelength bands (λ1', λ2', ..., λn') of the wavelength division multiplexing optical signals Sa to Sd after conversion are located on the longer wavelength side of the central wavelengths λa and λb of the excitation lights Xa and Xb. Further, the reference numeral "G72" indicates an example in which the wavelength bands (λ1, λ2, ..., λn) of the wavelength division multiplexing optical signals Sa to Sd before conversion are located on the shorter wavelength side of the center wavelengths λa and λb of the excitation lights Xa and Xb, and the wavelength bands (λ1', λ2', ..., λn') of the wavelength division multiplexing optical signals Sa to Sd after conversion are located on the longer wavelength side of the central wavelengths λa and λb of the excitation lights Xa and Xb.

The wavelength converters 12a to 12c, 12b', 44a to 44c, 52a to 52c, and 54a to 54c convert the wavelengths λ1, λ2, ..., and λn into wavelengths λ1', λ2', ..., λn' at symmetrical positions sandwiching the intermediate wavelength ((λa+λb)/2) of the center wavelengths λa and λb of the two excitation lights Xa and Xb on the wavelength axis. Therefore, the arrangement order of the wavelengths λ1', λ2', ..., λn' included in the wavelength band after conversion on the wavelength axis is the reverse order of the arrangement order of the wavelengths λ1, λ2, ..., λn included in the wavelength band before conversion.

Figure 17:
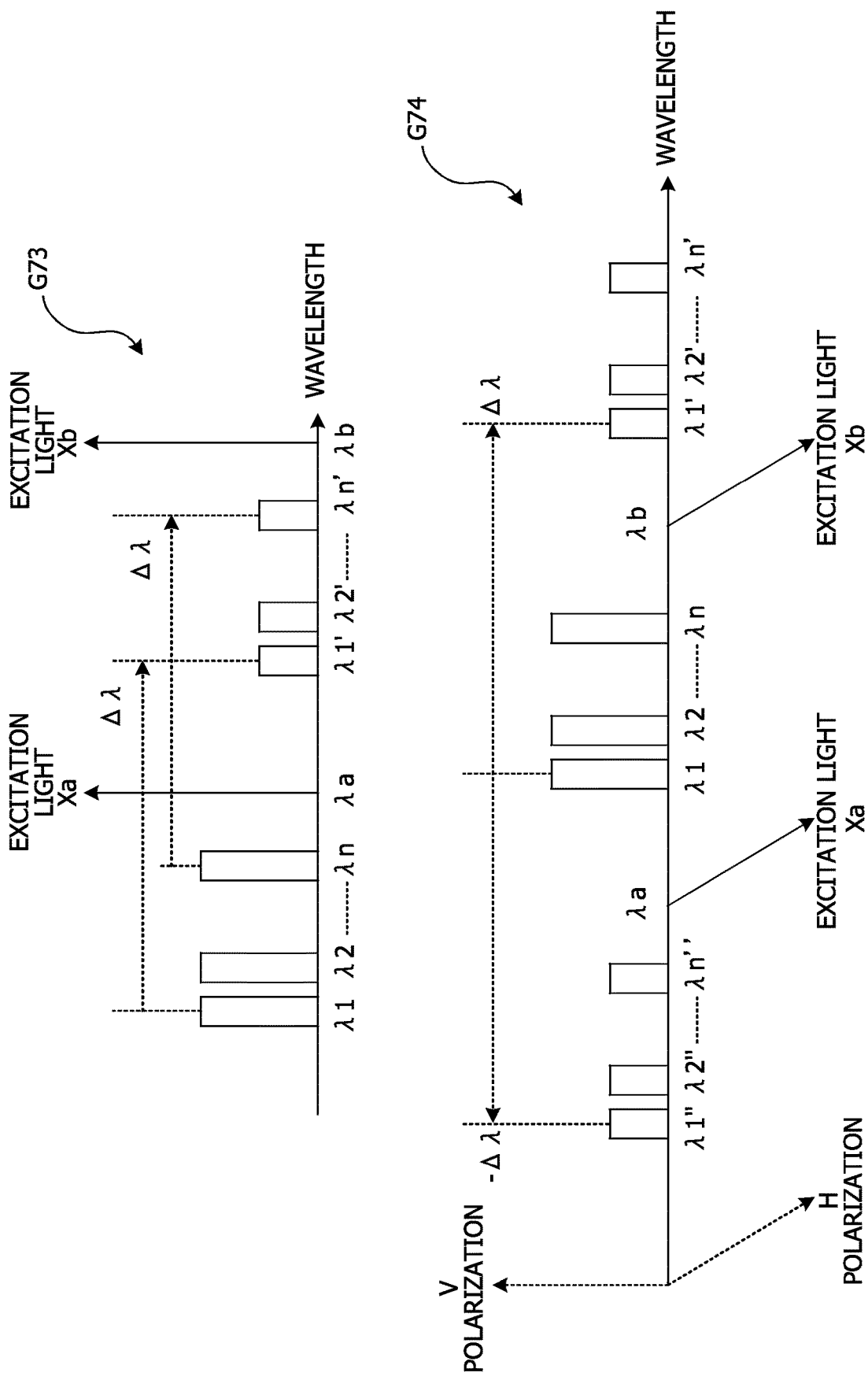
FIG. 17 is a diagram illustrating another example of the wavelength conversion by a wavelength converter including two excitation light sources.

FIG. 17 is a diagram illustrating another example of wavelength conversion by the wavelength converters 12a to 12c, 12b', 44a to 44c, 52a to 52c, and 54a to 54c provided with two excitation light sources 60 and 65.

The reference numeral "G73" indicates an example in which the wavelength bands (λ1, λ2, ..., λn) of the wavelength division multiplexing optical signals Sa to Sd before conversion are located on the shorter wavelength side of the center wavelength λa of the excitation light Xa, and the wavelength bands (λ1', λ2', ..., λn') of the wavelength division multiplexing optical signals Sa to Sd after conversion are located on the longer wavelength side of the center wavelength λa of the excitation light Xa and the shorter wavelength side of the center wavelength λb of the excitation light Xb. Here, the polarizations of the two excitation lights Xa and Xb are orthogonal to each other. Also, the polarization of the wavelength division multiplexing optical signals Sa to Sd is arbitrary.

The wavelength converters 12a to 12c, 12b', 44a to 44c, 52a to 52c, and 54a to 54c convert the wavelengths λ1, λ2, ..., λn into wavelengths λ1', λ2', ..., λn' at positions moved by a predetermined width Δλ on the wavelength axis, respectively. Therefore, the arrangement order of the wavelengths λ1', λ2', ..., λn' included in the wavelength band after conversion on the wavelength axis is the same as the arrangement order of the wavelengths λ1, λ2, ..., λn included in the wavelength band before conversion.

The reference numeral "G74" indicates an example in which the wavelength bands (λ1, λ2, ..., λn) of the wavelength multiplex optical signals Sa to Sd before conversion are located on the longer wavelength side of the central wavelength λa of the excitation light Xa and on the shorter wavelength side of the central wavelength λb of the excitation light Xb, and the wavelength bands ((λ1', λ2', ..., λn'), (λ1", λ2", ..., λn")) of the wavelength multiplex optical signals Sa to Sd after conversion are located on the longer wavelength side of the center wavelength λb of the excitation light Xb and the shorter wavelength side of the center wavelength λb of the excitation light Xb. Here, the polarizations of the two excitation lights Xa and Xb are V polarizations in the same direction, and are orthogonal to the polarizations of the wavelength multiplex optical signals Sa to Sd which are V polarizations.

The wavelength converters 12a to 12c, 12b', 44a to 44c, 52a to 52c, and 54a to 54c convert the wavelengths λ1, λ2, ..., λn into wavelengths λ1', λ2', ..., λn' at positions moved to the longer wavelength side by a predetermined width Δλ on the wavelength axis, respectively, and wavelengths λ1", λ2", ..., λn" at positions moved to the shorter wavelength side by a predetermined width Δλ on the wavelength axis, respectively. Therefore, the arrangement order of the wavelengths λ1', λ2', ..., λn', and λ1", λ2", ..., λn' included in the wavelength band after conversion on the wavelength axis is the same as the arrangement order of the wavelength λ1, λ2, ..., λn included in the wavelength band before conversion.

The wavelength converters 12a to 12c, 12b', 44a to 44c, 52a to 52c, and 54a to 54c select and output one of the two wavelength bands after conversion ((λ1', λ2', ..., λn'), (λ1", λ2", ..., λn")).

[Selection of Wavelength Arrangement Order at the Time of Wavelength Conversion]

The transmission characteristics (e.g., power) of each wavelength included in the wavelength band are biased to, for example, the long wavelength side or the short wavelength side. Therefore, as described below, the arrangement order of wavelengths at the time of wavelength conversion may be selected to reduce the bias of the transmission characteristics.

Figure 18:
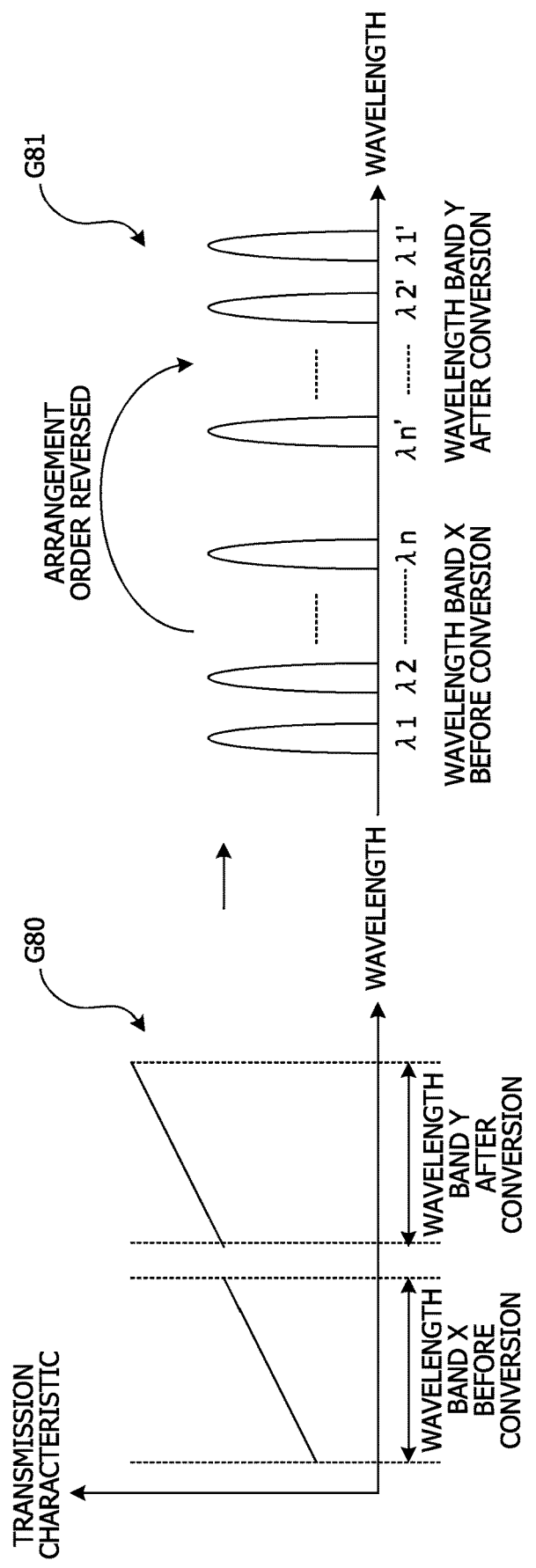
FIG. 18 is a diagram illustrating an example of an arrangement order of wavelengths when the transmission characteristics are worse for wavelengths on the shorter wavelength side before and after conversion of wavelength bands.

FIG. 18 is a diagram illustrating an example of the arrangement order of wavelengths when the transmission characteristics are worse as the wavelength on the shorter wavelength side before and after the conversion of the wavelength band. The reference numeral "G80" indicates an example of transmission characteristics of the wavelength band X before conversion and the wavelength band Y after conversion. The transmission characteristics of the wavelength band X before conversion and the wavelength band Y after conversion are worse as the wavelength on the shorter wavelength side.

The reference numeral "G81" indicates an example of the arrangement order of wavelengths when the wavelength band X is converted to the wavelength band Y. The wavelength converters 12a to 12c, 12b', 44a to 44c, 52a to 52c, and 54a to 54c convert the wavelengths λ1, λ2, ..., λn included in the wavelength band X into wavelengths λ1', λ2', ..., λn' at symmetrical positions sandwiching a predetermined center wavelength on the wavelength axis. Therefore, the arrangement order of the wavelengths λ1', λ2', ..., λn' included in the wavelength band Y after conversion is the reverse order of the arrangement order of the wavelengths λ1, λ2, ..., λn included in the wavelength band X before conversion.

Therefore, for example, the wavelengths λ1 and λ2 on the shorter wavelength side having poor transmission characteristics are converted into the wavelengths λ1' and λ2' on the longer wavelength side having good transmission characteristics. Further, for example, the wavelength λn on the longer wavelength side having good transmission characteristics is converted to the wavelength λn' on the shorter wavelength side having poor transmission characteristics. As a result, the transmission characteristics are averaged among the wavelengths λ1', λ2', ..., λn' included in the converted wavelength band Y.

In this example, an example of converting from the wavelength band X on the shorter wavelength side to the wavelength band Y on the longer wavelength side will be given. However, even when the wavelength band Y on the longer wavelength side is converted to the wavelength band X on the shorter wavelength side, the transmission characteristics are averaged by reversing the arrangement order of the wavelengths at the time of wavelength conversion in the same manner as described above. Further, in this example, descriptions have been made on an example in which the transmission characteristics deteriorate toward the shorter wavelength side. However, even when the transmission characteristics deteriorate toward the longer wavelength side, the transmission characteristics are averaged by reversing the arrangement order of the wavelengths at the time of wavelength conversion in the same manner as described above.

Figure 19:
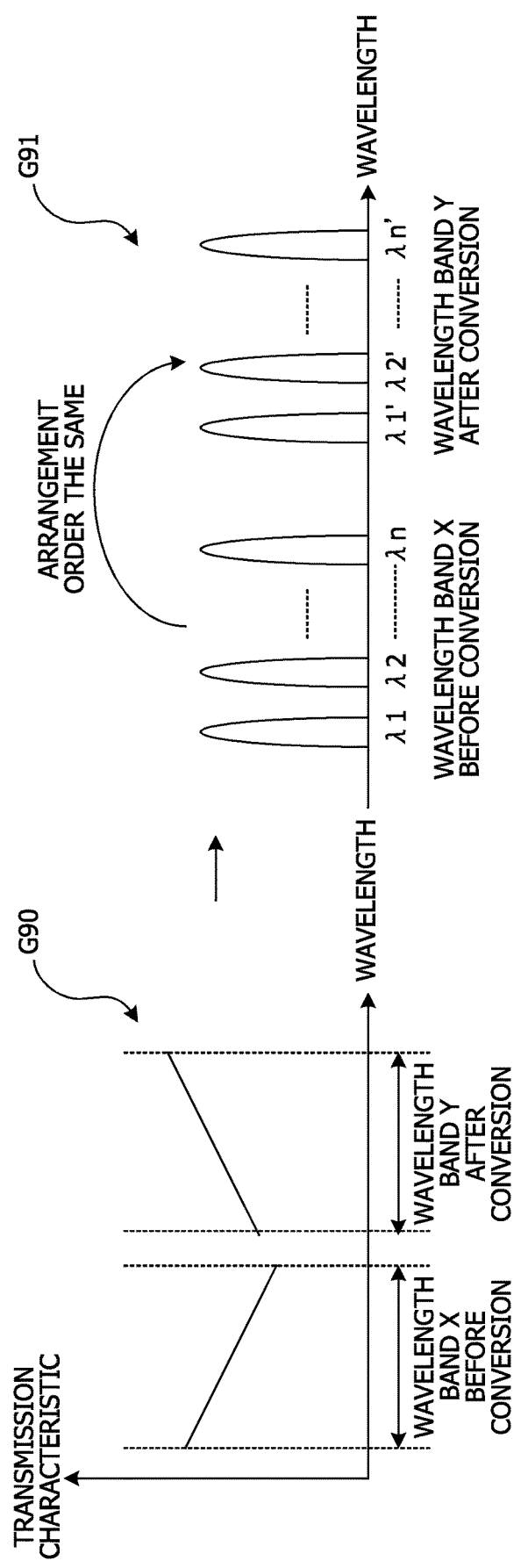
FIG. 19 is a diagram illustrating an example of the arrangement order of wavelengths when the wavelength on the longer wavelength side has poorer transmission characteristics before the wavelength band is converted and the transmission characteristics are worse on the shorter wavelength side after the wavelength band is converted.

FIG. 19 is a diagram illustrating an example of the arrangement order of wavelengths when the transmission characteristics are worse for the wavelengths on the longer wavelength side before the conversion of the wavelength band and the transmission characteristics are worse for the wavelengths on the shorter wavelength side after the conversion of the wavelength band. The reference numeral "G90" indicates an example of transmission characteristics of the wavelength band X before conversion and the wavelength band Y after conversion. The wavelength band X before conversion has worse transmission characteristics on the wavelength of the longer wavelength side, and the wavelength band Y after conversion has worse transmission characteristics on the wavelength of the shorter wavelength side.

The reference numeral "G91" indicates an example of the arrangement order of wavelengths when the wavelength band X is converted into the wavelength band Y. The wavelength converters 12a to 12c, 12b', 44a to 44c, 52a to 52c, and 54a to 54c convert the wavelengths λ1, λ2, ..., λn included in the wavelength band X into wavelengths λ1', λ2', ..., λn' at positions moved by a predetermined width on the wavelength axis, respectively. Therefore, the arrangement order of the wavelengths λ1', λ2', ..., λn' included in the wavelength band Y after conversion is the same as the arrangement order of the wavelengths λ1, λ2, ..., λn included in the wavelength band X before conversion.

Therefore, for example, the wavelengths λ1 and λ2 on the shorter wavelength side having good transmission characteristics are converted into the wavelengths λ1' and λ2' on the wavelength side with poor transmission characteristics. Further, for example, the wavelength λn on the longer wavelength side having poor transmission characteristics is converted into the wavelength λn' on the shorter wavelength side having good transmission characteristics. As a result, the transmission characteristics are averaged among the wavelengths λ1', λ2', ..., λn' included in the wavelength band Y after conversion.

In this example, an example of converting from the wavelength band X on the shorter wavelength side to the wavelength band Y on the longer wavelength side will be given. However, even when the wavelength band Y on the longer wavelength side is converted into the wavelength band X on the shorter wavelength side, the transmission characteristics are averaged by maintaining the arrangement order of the wavelengths at the time of wavelength conversion in the same manner as described above. Further, in this example, the transmission characteristics are worse on the longer wavelength side before conversion, and the transmission characteristics are worse on the shorter wavelength side after conversion. However, even when the transmission characteristics are worse on the shorter wavelength side before conversion and the transmission characteristics are worse on the longer wavelength side after conversion, the transmission characteristics are averaged by maintaining the arrangement order of the wavelengths at the time of wavelength conversion in the same manner as described above.

[Arrangement Order of Wavelengths at Both Ends of the Transmission Path is the Same]

The arrangement order of the wavelengths of the wavelength division multiplexing optical signals Sa to S may be the same at the time of transmission of the transmission device 2 and at the time of reception of the reception device 3 for normal transmission/reception. Since the transmission device 2 and the reception device 3 each perform the wavelength band conversion once, the wavelengths may be arranged in the same order at both ends of the transmission path 90. Descriptions will be made below on the relationship among the number of nodes 91 of the transmission system 9, the number of wavelength converters that reverse the arrangement order of wavelengths at each node 91, and the number of wavelength converters that maintain the same arrangement order of wavelengths.

Figure 20:
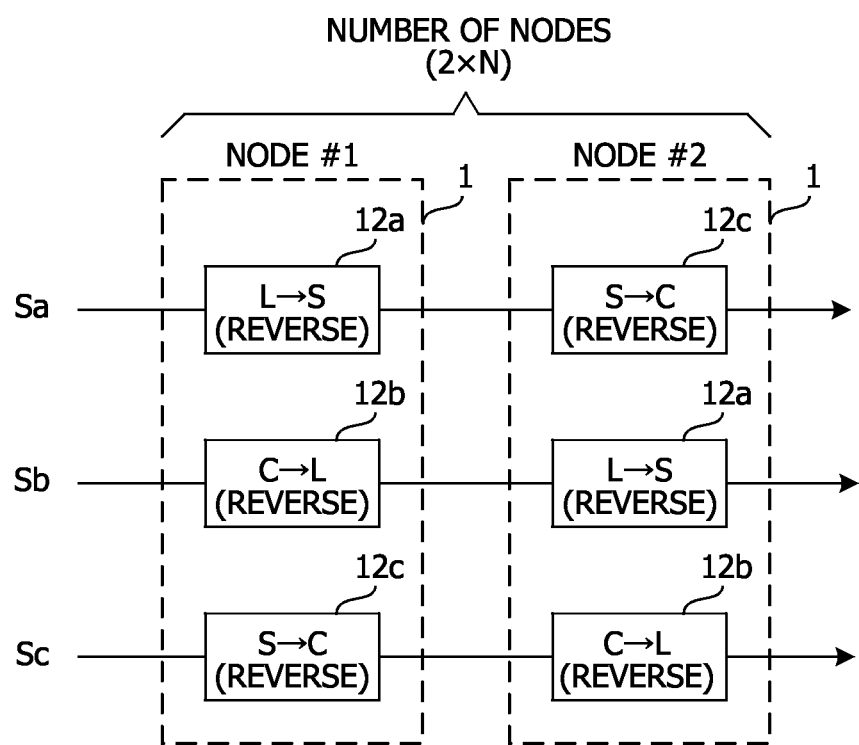
FIG. 20 is a diagram illustrating the wavelength conversion of a wavelength division multiplexing optical signal when all wavelength converters of each relay device of a node reverse the arrangement order of wavelengths.

FIG. 20 is a diagram illustrating the wavelength conversion of the wavelength division multiplexing optical signals Sa, Sb, and Sc when all the wavelength converters 12a, 12b, and 12c of the relay devices 1 of the nodes #1 and #2 reverse the arrangement order of the wavelengths. Here, the term "reverse" indicates that the wavelength converters 12a, 12b, and 12c perform a wavelength conversion to reverse the arrangement order of wavelengths.

The arrangement order of wavelengths of the wavelength division multiplexing optical signals Sa, Sb, and Sc is reversed each time the relay device 1 passes through the wavelength converters 12a, 12b, and 12c. For this reason, the arrangement order of the wavelengths is reversed when the node #1 is passed, but is reversed again and restored to the original order when the node #2 in the subsequent stage is passed. Therefore, when only the wavelength converters 12a, 12b, and 12c that reverse the arrangement order of the wavelengths are provided in the (2×N) nodes 91, the arrangement order of the wavelengths of the wavelength division multiplexing optical signals Sa, Sb, and Sc may be the same at both ends of the transmission path 90.

Figure 21:
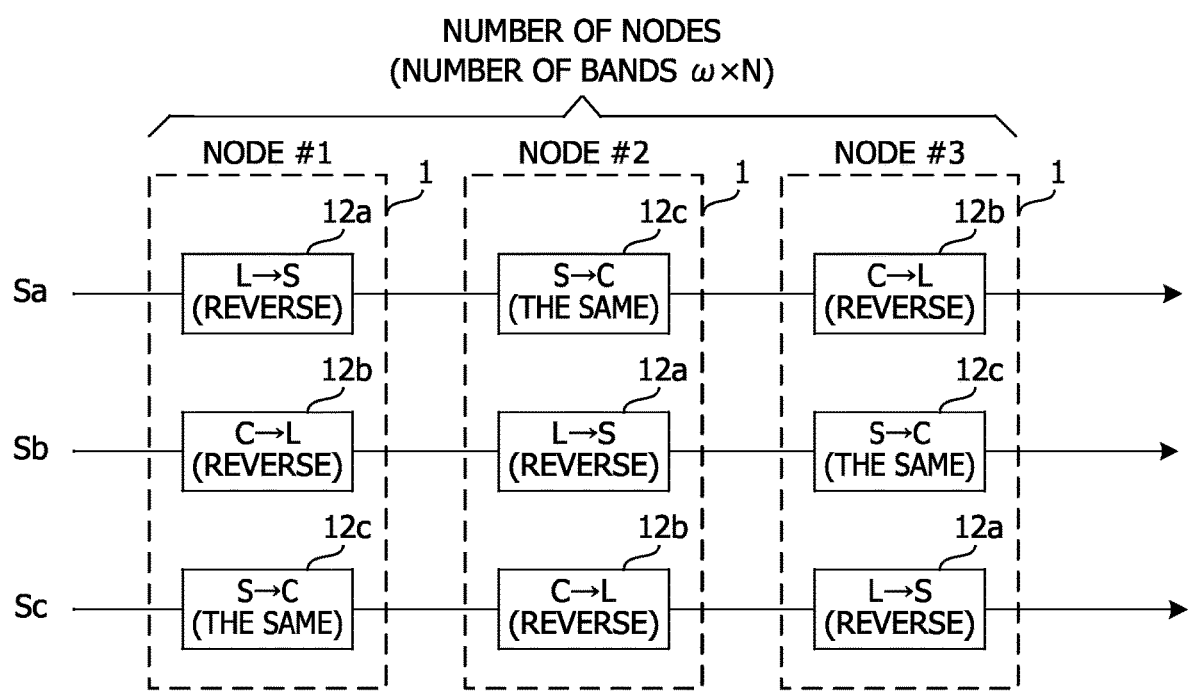
FIG. 21 is a diagram illustrating the wavelength conversion of a wavelength division multiplexing optical signal when two wavelength converters of each relay device of a node reverse the arrangement order of wavelengths.

FIG. 21 is a diagram illustrating the wavelength conversion of the wavelength division multiplexing optical signals Sa, Sb, and Sc when the two wavelength converters 12a, 12b, and 12c of the relay devices 1 of the nodes #1 to #3 reverse the arrangement order of the wavelengths. Here, the term "reverse" indicates that the wavelength converters 12a, 12b, and 12c perform a wavelength conversion to reverse the arrangement order of wavelengths, and the term "the same" indicates that the wavelength converters 12a, 12b, and 12c perform a wavelength conversion to maintain the arrangement order of wavelengths in the same order as the arrangement order before conversion.

In this example, as an example, each wavelength converter 12c that converts the wavelength band from the S-band to the C-band maintains the arrangement order of the wavelengths before and after the conversion, and the other wavelength converters 12a and 12b reverse the arrangement order of the wavelengths, but either one of the wavelength converters 12a and 12b may maintain the same order of wavelengths before and after the conversion.

Of the nodes #1 to #3, the wavelength division multiplexing optical signals Sa, Sb, and Sc have their wavelengths reversed in the wavelength conversion of the relay device 1 of the two nodes, and the arrangement order of the other one node is maintained the same before and after the conversion. For this reason, the arrangement order of the wavelengths is restored to the original order by two wavelength conversions (i.e., the wavelength conversion from the L-band to S-band and the wavelength conversion from the C-band to L-band) in which the arrangement order of wavelengths is reversed.

Therefore, when each of the wavelength division multiplexing optical signals Sa, Sb, and Sc is wavelength-converted to each of the L-band and the S-band at least once, the arrangement order of the wavelengths is restored. Therefore, when the wavelength converters 12a, 12b, and 12c that reverse the arrangement order of wavelengths are even-numbered (two in this example), and when the number of nodes is a multiple ($\omega \times N$) of $\omega$ of the number of wavelength bands (i.e., number of bands), the arrangement order of the wavelengths of the wavelength division multiplexing optical signals Sa, Sb, and Sc may be the same at both ends of the transmission path 90.

Figure 22:
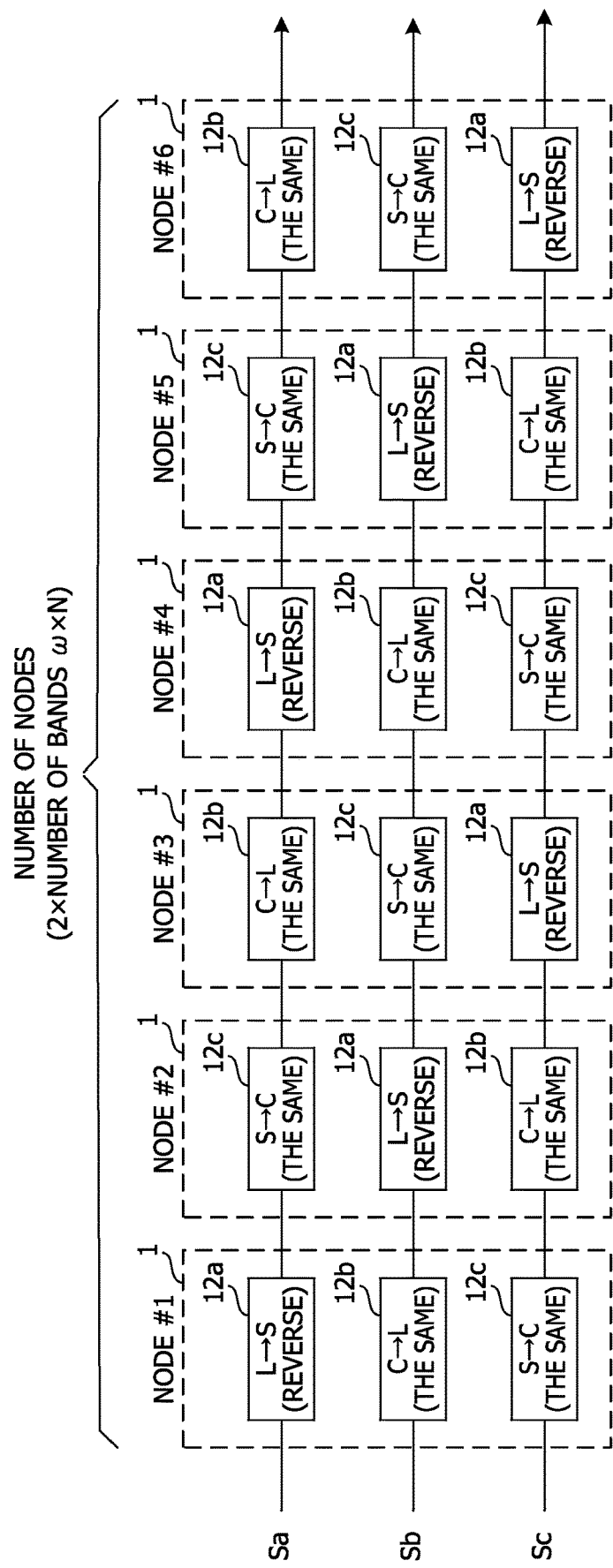
FIG. 22 is a diagram illustrating wavelength conversion of a wavelength division multiplexing optical signal when one wavelength converter of each relay device of a node reverses the arrangement order of wavelengths.

FIG. 22 is a diagram illustrating the wavelength conversion of the wavelength division multiplexing optical signals Sa, Sb, and Sc when one of the wavelength converters 12a, 12b, and 12c of each relay device 1 of the nodes #1 to #6 reverses the arrangement order of wavelengths. Here, the term "reverse" indicates that the wavelength converters 12a, 12b, and 12c perform a wavelength conversion to reverse the arrangement order of wavelengths, and the term "the same" indicates that the wavelength converters 12a, 12b, and 12c perform a wavelength conversion to maintain the arrangement order of wavelengths in the same order as the arrangement order before conversion.

In this example, as an example, each wavelength converter 12a that converts the wavelength band from the L-band to the S-band reverses the arrangement order of wavelengths, and the other wavelength converters 12b and 12c maintain the same arrangement order of wavelengths before and after the conversion. However, one of the wavelength converters 12b and 12c may maintain the same arrangement order of wavelengths before and after the conversion.

Of the nodes #1 to #6, the wavelength division multiplexing optical signals Sa, Sb, and Sc have their wavelengths reversed in the wavelength conversion of the relay device 1 of the two nodes, and the arrangement order of the other four nodes is maintained before and after the conversion. Therefore, the arrangement order of wavelengths is restored to the original order by two wavelength conversions (i.e., the wavelength conversion from the L-band to the S-band) in which the arrangement order of the wavelengths is reversed.

Therefore, when each of the wavelength division multiplexing optical signals Sa, Sb, and Sc is converted into the S-band even times, the arrangement order of the wavelengths is restored. Therefore, when the wavelength converters 12a, 12b, and 12c that reverse the arrangement order of wavelengths are odd-numbered (one in this example), and when the number of nodes is an even number ($2 \times \omega \times N$) having the number of bands $\omega$, the arrangement order of wavelengths of the wavelength division multiplexing optical signals Sa, Sb, and Sc may be the same at both ends of the transmission path 90.

The embodiments described above are examples of preferred embodiments of the present disclosure. However, the present disclosure is not limited thereto, and various modifications may be made without departing from the gist of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission device comprising:
a demultiplexer configured to demultiplex a multiplexed light obtained by multiplexing a plurality of wavelength division multiplexing (WDM) optical signals including different wavelength bands into the plurality of WDM optical signals;
a plurality of optical amplifiers configured to amplify the plurality of WDM optical signals, respectively;
a wavelength converter configured to convert a first wavelength band of the wavelength bands of at least a first WDM optical signal of the plurality of WDM optical signals amplified by the plurality of optical amplifiers into second wavelength band of the wavelength bands of a second WDM optical signal of the plurality of WDM optical signals so that the second wavelength band does not overlap among the wavelength bands; and
a multiplexer configured to multiplex the plurality of WDM optical signals which include the wavelength bands converted by the wavelength converter.

2. The transmission device according to claim 1,
wherein a transmission characteristic of the first WDM optical signals is worse in a long wavelength side or a short wavelength side before and after the conversion of the first wavelength band into the second wavelength band, than a center wavelength portion, and
wherein the wavelength converter converts the first wavelength band into the second wavelength band at a symmetrical position that sandwiches a predetermined center wavelength over a wavelength axis.

3. The transmission device according to claim 1,
wherein a transmission characteristic of the first WDM optical signals is worse in one side of a long wavelength side and a short wavelength side before the conversion of the first wavelength band into the second wavelength band, and is worse in an other side of the long wavelength side and the short wavelength side after the conversion, and
wherein the wavelength converter converts the first wavelength band into the second wavelength band at a position moved by a predetermined width over a wavelength axis.

4. The transmission device according to claim 1, wherein the wavelength converter converts the first wavelength band into the second wavelength band by a plurality of steps of wavelength conversions.

5. The transmission device according to claim 1, further comprising:
a plurality of optical switches configured to select a path of an output destination of the plurality of WDM optical signals demultiplexed by the demultiplexer from a path that reaches the multiplexer through the wavelength converter and a path that bypasses the wavelength converter and reaches the multiplexer;
a detector configured to detect a transmission characteristic of each of the plurality of WDM optical signals; and
a processor configured to control the plurality of optical switches so that a difference in transmission characteristics detected by the detector is reduced.

6. A transmission method comprising:
demultiplexing a multiplexed light obtained by multiplexing a plurality of wavelength division multiplexing (WDM) optical signals including different wavelength bands into the plurality of WDM optical signals, by a demultiplexer;
amplifying each of the plurality of WDM optical signals, by a plurality of optical amplifiers;
converting a first wavelength band of the wavelength bands of at least a first WDM optical signal of the plurality of WDM optical signals amplified by the plurality of optical amplifiers into a second wavelength band of the wavelength bands so that the second wavelength band does not overlap among the wavelength bands, by a wavelength converter; and
multiplexing the plurality of WDM optical signals which include the wavelength bands converted by the wavelength converter, by a multiplexer.

7. The transmission method according to claim 6,
wherein a transmission characteristic of the first WDM optical signals is worse in a long wavelength side or a short wavelength side before and after the conversion of the first wavelength band into the second wavelength band, than a center wavelength portion, and
wherein the wavelength converter converts the first wavelength band into the second wavelength band at a symmetrical position that sandwiches a predetermined center wavelength over a wavelength axis.

8. The transmission method according to claim 6,
wherein a transmission characteristic of the first WDM optical signals is worse on one side of a long wavelength side and a short wavelength side before the conversion of the first wavelength band into the second wavelength band, and is worse in an other side of the long wavelength side and the short wavelength side after the conversion, and
wherein the wavelength converter converts the first wavelength band into the second wavelength band at a position moved by a predetermined width over a wavelength axis.

9. The transmission method according to claim 6, wherein the wavelength converter converts the first wavelength band into the second wavelength band by a plurality of steps of wavelength conversions.

10. The transmission method according to claim 6, further comprising:
selecting a path of an output destination of the plurality of WDM optical signals demultiplex by the demultiplexer from a path that reaches the multiplexer through the wavelength converter and a path that bypasses the wavelength converter and reaches the multiplexer, by a plurality of optical switches;
detecting a transmission characteristic of each of the plurality of WDM optical signals, by a detector; and
controlling the plurality of optical switches so that a difference in transmission characteristics detected by the detector is reduced, by a processor.

11. A transmission system comprising:
a transmission device configured to transmit a multiplexed light obtained by multiplexing a plurality of wavelength division multiplexing (WDM) optical signals including different wavelength bands;
a reception device configured to receive the multiplexed light; and
one or more transmission devices provided over a transmission path between the transmission device and the reception device, a transmission device of the transmission devices including:
a demultiplexer configured to demultiplex the multiplexed light into the plurality of WDM optical signals,
a plurality of optical amplifiers configured to amplify the plurality of WDM optical signals, respectively,
a wavelength converter configured to convert a first wavelength band of the wavelength bands of at least a first WDM optical signal of the plurality of WDM optical signals amplified by the plurality of optical amplifiers into a second wavelength band of the wavelength bands of a second WDM optical signal of the plurality of WDM optical signals so that the second wavelength band does not overlap among the wavelength bands, and
a multiplexer configured to multiplex the plurality of WDM optical signals which include the wavelength bands converted by the wavelength converter.

12. The transmission system according to claim 11, wherein the one or more transmission devices are provided so as to divide the transmission path into transmission sections that are a multiple of a number of the WDM optical signals.

\* \* \* \* \*